US008848078B2

(12) United States Patent
Okano

(10) Patent No.: US 8,848,078 B2
(45) Date of Patent: *Sep. 30, 2014

(54) BOOSTER CIRCUIT, SOLID-STATE IMAGING DEVICE, AND CAMERA SYSTEM

(71) Applicant: Sony Corporation, Tokyo (JP)

(72) Inventor: Masafumi Okano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/633,359

(22) Filed: Oct. 2, 2012

(65) Prior Publication Data

US 2013/0027018 A1    Jan. 31, 2013

Related U.S. Application Data

(62) Division of application No. 12/543,564, filed on Aug. 19, 2009, now Pat. No. 8,289,424.

(30) Foreign Application Priority Data

Aug. 22, 2008   (JP) ................................. 2008-214706

(51) Int. Cl.
*H04N 3/14*   (2006.01)
*H04N 5/335*  (2011.01)
*H02M 3/07*   (2006.01)

(52) U.S. Cl.
CPC ........................................ *H02M 3/07* (2013.01)
USPC ........................................... 348/300; 348/308

(58) Field of Classification Search
USPC ............................................... 348/308, 222.1
See application file for complete search history.

(56) References Cited

U.S. PATENT DOCUMENTS

| 2006/0001752 A1* | 1/2006 | Yanagisawa et al. .......... 348/308 |
| 2006/0076934 A1* | 4/2006 | Ogata et al. .................... 320/136 |
| 2008/0122941 A1* | 5/2008 | Kikuchi et al. ............. 348/222.1 |
| 2008/0211951 A1* | 9/2008 | Wakabayashi et al. ....... 348/308 |
| 2009/0009642 A1  | 1/2009 | Joshi et al. |
| 2009/0256940 A1* | 10/2009 | Pahr .............................. 348/308 |

FOREIGN PATENT DOCUMENTS

JP    3802239    5/2006

* cited by examiner

*Primary Examiner* — Sinh Tran
*Assistant Examiner* — Christopher K Peterson
(74) *Attorney, Agent, or Firm* — Dentons US LLP

(57) ABSTRACT

A booster circuit including an output terminal; a reference voltage generating section that generates a boosting reference voltage; a charge pump section that boosts the reference voltage and outputs the boosted reference voltage from the output terminal; and an output-terminal voltage holding section that holds the output terminal at a voltage of a high level at a standby time. The charge pump section includes an input node, at least one boosting node, at least one reference node, at least one boosting capacitor, and a plurality of switching transistors that are provided between the input node and the at least one boosting node, between a boosting node at a last stage and the output terminal, between the input node and the reference node, and between a reference potential and a reference node, and are switched on or off by a switch signal.

5 Claims, 16 Drawing Sheets

BOOSTER CIRCUIT, SOLID-STATE IMAGING DEVICE, AND CAMERA SYSTEM

RELATED APPLICATION DATA

This application is a division of U.S. patent application Ser. No. 12/543,564, filed on Aug. 19, 2009, the entirety of which is incorporated herein by reference to the extent permitted by law. The present invention claims priority to and contains subject matter related to Japanese Patent Application No. JP 2008-214706 filed in the Japan Patent Office on Aug. 22, 2008, the entire contents of which being incorporated herein by reference.

BACKGROUND OF THE INVENTION

1. Field of the Invention

The present invention relates to a booster circuit, and a solid-state imaging device, typified by a CMOS image sensor, and a camera system to both of which the booster circuit is applicable.

2. Description of the Related Art

In recent years, a CMOS image sensor is drawing attention as a solid-state imaging device (image sensor) to replace a CCD (Charge Coupled Device).

This is because the CMOS image sensor overcomes the following problems.

A dedicated process is needed to fabricate CCD pixels, and a plurality of supply voltages are needed for the operation of the CCD pixels. In addition, it is necessary to combine a plurality of peripheral ICs with the CCD pixels and operate the peripheral ICs.

The use of such a CCD raises various problems including one to make the system very complex, which are overcome by the CMOS image sensor.

The fabrication process for a general CMOS integrated circuit can be used in fabricating a CMOS image sensor. In addition, the CMOS image sensor can be driven by a single power supply. Further, an analog circuit and a logic circuit using the CMOS process can be mixed in the same chip.

The CMOS image sensor therefore has a plurality of significant merits including one capable of reducing the number of peripheral ICs.

The mainstream of the output circuit of a CCD is 1-channel (ch) output using an FD amplifier having an FD (Floating Diffusion).

By way of contrast, a CMOS image sensor has an FD amplifier for each pixel, the mainstream of the output of the CMOS image sensor is a column parallel output type which selects one row of pixels from a pixel array and reads out charges from the pixels in the column direction at a time.

This is because the FD amplifier disposed in a pixel has a difficulty in obtaining sufficient drive performance, thus making it necessary to lower the data rate, so that parallel processing is advantageous.

Such a CMOS image sensor with a sensor section includes a pixel array section having a two-dimensional array of pixel circuits having a predetermined structure, a pixel drive section (vertical scanning circuit), and a column circuit (column processing circuit).

Those sections are formed in large-scale integration (LSI).

From the viewpoint of providing an LSI with a single power supply, it is useful to provide a circuit for boosting or stepping down an externally supplied voltage inside the LSI.

For example, a CMOS image sensor often uses two kinds of supply voltages supplied externally, namely a voltage for analog circuits and a voltage for digital circuits.

In making the use of the merit of the CMOS image sensor that the CMOS image sensor can be fabricated in the same process as used for a general-purpose CMOS LSI, providing a step-up/step-down circuit in the sensor can allow multiple types of supply voltages to be used in the circuits in the image sensor.

That is, although only two kinds of voltages are supplied externally, the circuits inside the CMOS image sensor can operate as an aggregate of multi power supply circuits. (See Japanese Patent No. 3802239 (Patent Document 1)).

SUMMARY OF THE INVENTION

When a CMOS image sensor incorporates a booster circuit or the like, it is necessary to intervene a level shifter at the time of exchanging signals among individual circuit blocks.

The level shifter is premised on that a high-level (=VH) voltage and a low-level (=VL) voltage are to be supplied stably.

In the transition from, for example, a standby state to an operational state, however, there occurs a time when the high-low relation of the voltages is reversed, which may cause the level shifter to malfunction and an excess through current to flow in the level shifter, thus increasing power consumption.

A solution to this problem has been proposed which provides a CMOS image sensor with a special internal circuit to prevent the level shifter from malfunctioning at the time of the transition from the standby state to the operational state (see, for example, Japanese Patent No. 3802239 (Patent Document 1)).

However, this art needs a special internal circuit, leading to disadvantageous circuit complication and circuit enlargement.

Thus, it is desirable to provide a booster circuit, solid-state imaging device, and camera system which can generate a boosted voltage while suppressing malfunction of subsequent-stage circuits without causing circuit complication and circuit enlargement, and increasing power consumption.

A booster circuit according to an embodiment of the present invention includes an output terminal, a reference voltage generating section that generates a boosting reference voltage, a charge pump section that boosts the reference voltage and outputs the boosted reference voltage from the output terminal, and an output-terminal voltage holding section that holds the output terminal at a voltage of a high level at a standby time. The charge pump section includes an input node to which the reference voltage is input, at least one boosting node formed between the input node and the output terminal, at least one reference node corresponding to the boosting node and formed between the input node and a reference potential, at least one boosting capacitor having a first terminal connected to a corresponding boosting node and a second terminal connected to a corresponding reference node, and a plurality of switching transistors that are provided between the input node and the at least one boosting node, between a boosting node at a last stage and the output terminal, between the input node and the reference node, and between the reference potential and the reference node, and are switched on or off by a switch signal, and at the standby time, the output-terminal voltage holding section connects an output side of the reference voltage generating section or the output terminal to a potential equivalent to the high level, and controls an on/off action of those of the switching transistors which are connected between at least the input node in the charge pump section and the output terminal, depending on whether the potential is connected to the output side of the reference voltage generating section or the output terminal.

It is preferable that at the standby time, when the potential is connected to the output side of the reference voltage generating section, the output-terminal voltage holding section should perform control in such a way that all of the switching transistors which are connected between the input node in the charge pump section and the output terminal are turned on.

It is preferable that in the charge pump section, those of the plurality of switching transistors which are connected between at least the input node and the output terminal should include a parasitic diode, and should be connected in such a way that the parasitic diode has a forward direction from the input node toward the output terminal, and wherein at the standby time, when the potential is connected to the output side of the reference voltage generating section, the output-terminal voltage holding section should perform control in such a way that the switching transistors which are connected between at least the input node and the output terminal, and at least switching transistors connected to the input node among the switching transistors connected between the input node and the reference potential are turned off.

It is preferable that in the charge pump section, the plurality of switching transistors should include a parasitic diode, the switching transistors which are connected between the input node and the output terminal should be connected in such a way that the parasitic diode has a forward direction from the input node toward the output terminal, and the switching transistors which are connected between the input node and the reference potential should be connected in such a way that the forward direction of the parasitic diode is from the reference potential toward the input node, and at the standby time, when the potential is connected to the output side of the reference voltage generating section, the output-terminal voltage holding section should perform control in such a way that the plurality of the switching transistors are turned off.

It is preferable that at the standby time, when the potential is connected to the output terminal, the output-terminal voltage holding section should perform control in such a way that, of the switching transistors connected between the input node in the charge pump section and the output terminal, those switching transistors which are connected at least between the output terminal and the boosting node are turned off.

It is preferable that in the charge pump section, those of the plurality of switching transistors which are connected between at least the input node and the output terminal should include a parasitic diode, and should be connected in such a way that the parasitic diode has a forward direction from the input node toward the output terminal, and at the standby time, when the potential is connected to the output terminal, the output-terminal voltage holding section should perform control in such a way that the switching transistors which are connected between at least the input node and the output terminal, and at least switching transistors connected to the input node among the switching transistors connected between the input node and the reference potential are turned off.

It is preferable that in the charge pump section, the plurality of switching transistors should include a parasitic diode, the switching transistors which are connected between the input node and the output terminal should be connected in such a way that the parasitic diode has a forward direction from the input node toward the output terminal, and the switching transistors which are connected between the input node and the reference potential should be connected in such a way that the forward direction of the parasitic diode is from the reference potential toward the input node, and at the standby time, when the potential is connected to the output terminal, the output-terminal voltage holding section should perform control in such a way that the plurality of the switching transistors are turned off.

It is preferable that the switching transistors in the charge pump section should be field effect transistors, and the output-terminal voltage holding section should use a boosted voltage from the output terminal for a drive voltage of the switch signal for the switching transistors.

It is preferable that the output-terminal voltage holding section should include a voltage to be determined by a voltage-divided voltage of the boosted voltage from the output terminal in the drive voltage.

A solid-state imaging device according to another embodiment of the invention includes a pixel section having a matrix of a plurality of pixel circuits having a function of converting a light signal to an electric signal and storing the electric signal according to an exposure time, a pixel drive section that is drivable to read image data from the pixel section in response to a control signal, and a boosting power supply section that includes a booster circuit and sets the control signal to a voltage level boosted by the booster circuit. The booster circuit includes an output terminal, a reference voltage generating section that generates a boosting reference voltage, a charge pump section that boosts the reference voltage and outputs the boosted reference voltage from the output terminal, and an output-terminal voltage holding section that holds the output terminal at a voltage of a high level at a standby time. The charge pump section includes an input node to which the reference voltage is input, at least one boosting node formed between the input node and the output terminal, at least one reference node corresponding to the boosting node and formed between the input node and a reference potential, at least one boosting capacitor having a first terminal connected to a corresponding boosting node and a second terminal connected to a corresponding reference node, and a plurality of switching transistors that are provided between the input node and the at least one boosting node, between a boosting node at a last stage and the output terminal, between the input node and the reference node, and between the reference potential and the reference node, and are switched on or off by a switch signal, and at the standby time, the output-terminal voltage holding section connects an output side of the reference voltage generating section or the output terminal to a potential equivalent to the high level, and controls an on/off action of those of the switching transistors which are connected between at least the input node in the charge pump section and the output terminal, depending on whether the potential is connected to the output side of the reference voltage generating section or the output terminal.

A camera system according to a further embodiment of the invention includes a solid-state imaging device, an optical system that forms a subject image in the solid-state imaging device, and a signal processing circuit that processes an output image signal from the solid-state imaging device. The solid-state imaging device includes a pixel section having a matrix of a plurality of pixel circuits having a function of converting a light signal to an electric signal and storing the electric signal according to an exposure time, a pixel drive section that is drivable to read image data from the pixel section in response to a control signal, and a boosting power supply section that includes a booster circuit and sets the control signal to a voltage level boosted by the booster circuit, the booster circuit includes an output terminal, a reference voltage generating section that generates a boosting reference voltage, a charge pump section that boosts the reference voltage and outputs the boosted reference voltage from the output terminal, and an output-terminal voltage holding section that holds the output terminal at a voltage of a high level at a standby time, the charge pump section includes an input node to which the reference voltage is input, at least one boosting node formed between the input node and the output terminal, at least one reference node corresponding to the boosting node and formed between the input node and a reference potential, at least one boosting capacitor having a first terminal connected to a corresponding boosting node and a second terminal connected to a corresponding reference node, and a plurality of switching transistors that are provided between the input node and the at least one boosting node, between a boosting node at a last stage and the output terminal, between the input node and the reference node, and between the reference potential and the reference node, and are switched on or off by a switch signal, and at the standby time, the output-terminal voltage holding section connects an output side of the reference voltage generating section or the output terminal to a potential equivalent to the high level, and controls an on/off action of those of the switching transistors which are connected between at least the input node in the charge pump section and the output terminal, depending on whether the potential is connected to the output side of the reference voltage generating section or the output terminal.

According to the embodiments of the invention, at the standby time where a boosting operation is not carried out, the output-terminal voltage holding section connects the output side of the reference voltage generating section or the output terminal to a potential equivalent to a high level.

When the potential is connected to the output side of the reference voltage generating section, for example, the output-terminal voltage holding section performs control in such a way that all of the switching transistors connected between the input node of the charge pump section and the output terminal are turned on.

When the potential is connected to the output terminal, the output-terminal voltage holding section performs control in such a way that, of the switching transistors connected between the input node in the charge pump section and the output terminal, those switching transistors which are connected at least between the output terminal and the boosting node are turned off.

According to the embodiments of the invention, it is possible to generate a boosted voltage while suppressing malfunction of subsequent-stage circuits without causing circuit complication and circuit enlargement, and increasing power consumption.

DESCRIPTION OF THE PREFERRED EMBODIMENTS

Preferred embodiments of the present invention will be described below with reference to the accompanying drawings. The description is given in the following order.
1. First Embodiment (General Configuration of Solid-state Imaging Device: Configuration of CMOS Image Sensor)
2. Configuration of Boosting Power Supply Section (General Configuration Including Booster Circuit and Level Shifter)
3. First Example (First Configurational Example of Holding Voltage At Output Terminal With Booster Circuit in Standby Mode)
4. Second Example (Second Configurational Example of Holding Voltage At Output Terminal With Booster Circuit in Standby Mode)
5. Third Example (Third Configurational Example of Holding Voltage At Output Terminal With Booster Circuit in Standby Mode)
6. Fourth Example (Fourth Configurational Example of Holding Voltage At Output Terminal With Booster Circuit in Standby Mode)
7. Second Embodiment (Another Configuration of Solid-state Imaging Device: Configurational Example Compatible With Column ADC)
8. Third Embodiment (Configurational Example of Camera System to Which Solid-state Imaging Device is Applicable)

<1. First Embodiment>

Figure 1:
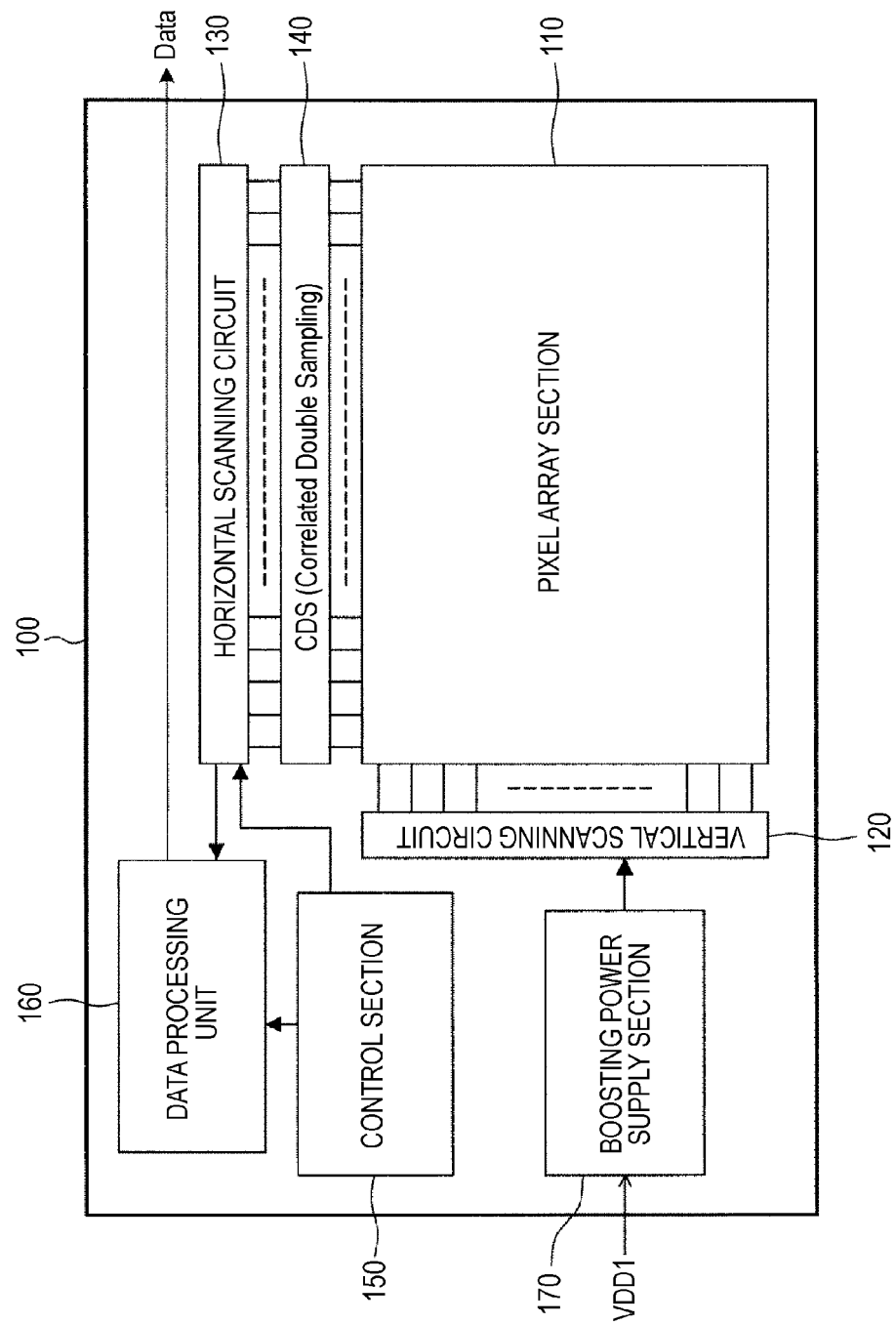
FIG. 1 is a diagram showing a configurational example of a CMOS image sensor (solid-state imaging device) which uses a booster circuit according to an embodiment of the present invention.

FIG. 1 is a diagram showing a configurational example of a CMOS image sensor (solid-state imaging device) which uses a booster circuit according to a first embodiment of the invention.

This CMOS image sensor 100 has a pixel array section 110, a vertical scanning circuit 120 and horizontal scanning circuit 130 as a pixel drive section, a column reading circuit 140, a control section 150, a data processing unit 160, and a boosting power supply section 170.

The pixel array section 110, the vertical scanning circuit 120 and horizontal scanning circuit 130 as the pixel drive section, the column reading circuit 140, the control section 150, the data processing unit 160, and the boosting power supply section 170 are designed into LSI.

The pixel array section 110 has a two-dimensional array (matrix) of a plurality of pixel circuits 110A.

The solid-state imaging device 100 has a structure as a control system for sequentially reading signals from the pixel array section 110.

That is, the solid-state imaging device 100 has the control section 150 which generates an internal clock, for example, the vertical scanning circuit 120 which controls a row address and row scanning, the horizontal scanning circuit 130 which controls a column address and column scanning, the column reading circuit 140, and the data processing unit 160. The boosting power supply section 170 will be elaborated later.

Figure 2:
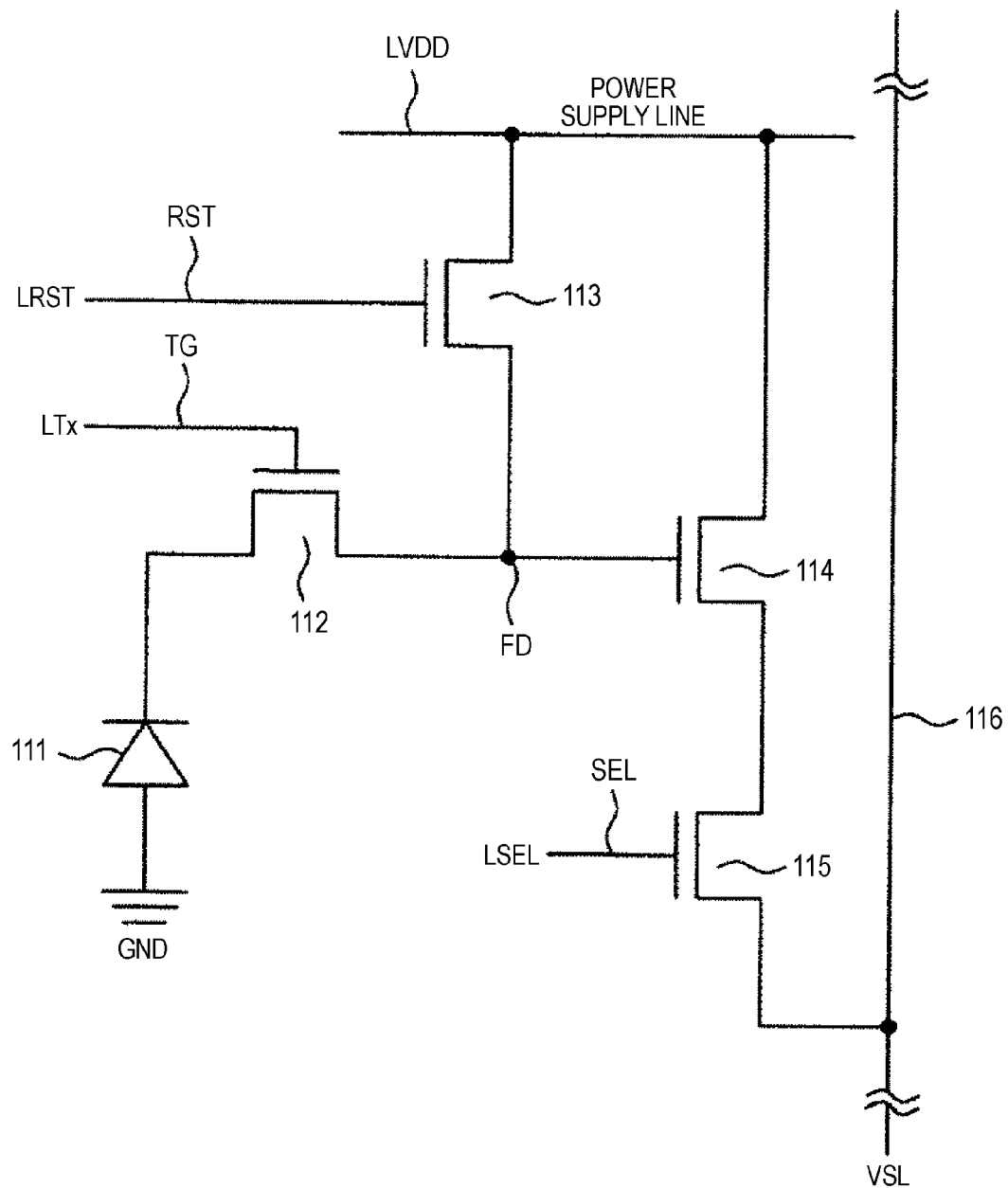
FIG. 2 is a diagram showing an example of a pixel in the CMOS image sensor which has four transistors according to the embodiment.

FIG. 2 is a diagram showing an example of a pixel in the CMOS image sensor which has four transistors according to the embodiment.

The pixel circuit 110A has a photoelectric converting element 111 formed by, for example, a photodiode.

For the single photoelectric converting element 111, the pixel circuit 110A has four transistors, namely a transfer transistor 112, a reset transistor 113, an amplifying transistor 114 and a select transistor 115, as active elements.

The photoelectric converting element 111 photoelectrically converts incident light to charges (electrons in this example) according to the amount of the light.

The transfer transistor 112 is connected between the photoelectric converting element 111 and a floating diffusion FD as an output node, and has a gate (transfer gate) supplied with a transmission signal TG as a control signal via a transfer control line LTx.

As a result, the transfer transistor 112 transfers electrons, photoelectrically converted by the photoelectric converting element 111, to the floating diffusion FD.

The reset transistor 113 is connected between a power supply line LVDD and the floating diffusion FD, and has a gate supplied with a reset signal RST as a control signal via a reset control line LRST.

As a result, the reset transistor 113 resets the potential of the floating diffusion FD to the potential of the power supply line LVDD.

The floating diffusion FD is connected with the gate of the amplifying transistor 114. The amplifying transistor 114 is connected to a signal line 116 via the select transistor 115, forming a source follower with a constant current source located outside the pixel part.

A select signal SEL as a control signal according to an address signal is supplied to the gate of the select transistor 115 via a select control line LSEL, setting the select transistor 115 on.

When the select transistor 115 is turned on, the amplifying transistor 114 amplifies the potential of the floating diffusion FD, and outputs a voltage according to the amplified potential to the signal line 116. The voltage output from each pixel is output to the column reading circuit 140 via the signal line 116.

As the gates of the transfer transistor 112, the reset transistor 113 and the select transistor 115 are connected row by row, those operations are executed at a time for one row of pixels.

Each reset control line LRST, transfer control line LTx and select control line LSEL laid out in the pixel array section 110 are laid out as one set for each row in the pixel array.

The reset control line LRST, transfer control line LTx and select control line LSEL are driven by the vertical scanning circuit 120.

The vertical scanning circuit 120 has a function of designating a row at the time of the shutter operation or readout operation of the solid-state imaging device is executed.

The vertical scanning circuit 120 is supplied with a boosted voltage VB from the boosting power supply section 170.

The vertical scanning circuit 120 applies the reset signal RST having the amplitude of the boosted voltage, e.g., 3.6 V, boosted by the boosting power supply section 170, to at least the reset control line LRST in the reset control line LRST, the transfer control line LTx and the select control line LSEL to drive the reset control line LRST.

That is, at least the reset signal RST is set to the level (e.g., 3.6 V) of the boosted voltage.

Of course, the vertical scanning circuit 120 can apply the transmission signal TG having an amplitude of the boosted voltage, e.g., 3.6 V, boosted by the boosting power supply section 170, to the transfer control line LTx to drive the transfer control line LTx.

Likewise, the vertical scanning circuit 120 can apply the select signal SEL having an amplitude of the boosted voltage, e.g., 3.6 V, boosted by the boosting power supply section 170, to the select control line LSEL to drive the select control line LSEL.

The column reading circuit 140 receives data form a pixel row read under the control of the vertical scanning circuit 120, and transfers the read data to the data processing unit 160 at the subsequent stage via the horizontal scanning circuit 130.

The column reading circuit 140 has a function of performing signal processing, such as correlated double sampling (CDS).

<2. Configuration of Boosting Power Supply Section)

The specific configuration and functions of the boosting power supply section 170 according to the embodiment will be described below.

According to the embodiment, the output terminal voltage of an operational amplifier 171 for generating a reference voltage in the boosting power supply section 170 is held at the high-level voltage at the standby time.

Alternatively, the output terminal voltage of the charge pump section is held at the high-level voltage at the standby time.

Further, a plurality of switching transistors that form the charge pump section are held in an OFF state at the standby time.

The output terminal voltage and a voltage which is determined by voltage division of the output terminal voltage can be used in the charge pump section as drive voltages for the individual transistors forming the charge pump section.

A more specific configurational example of the boosting power supply section 170 will be described below.

Figure 3:
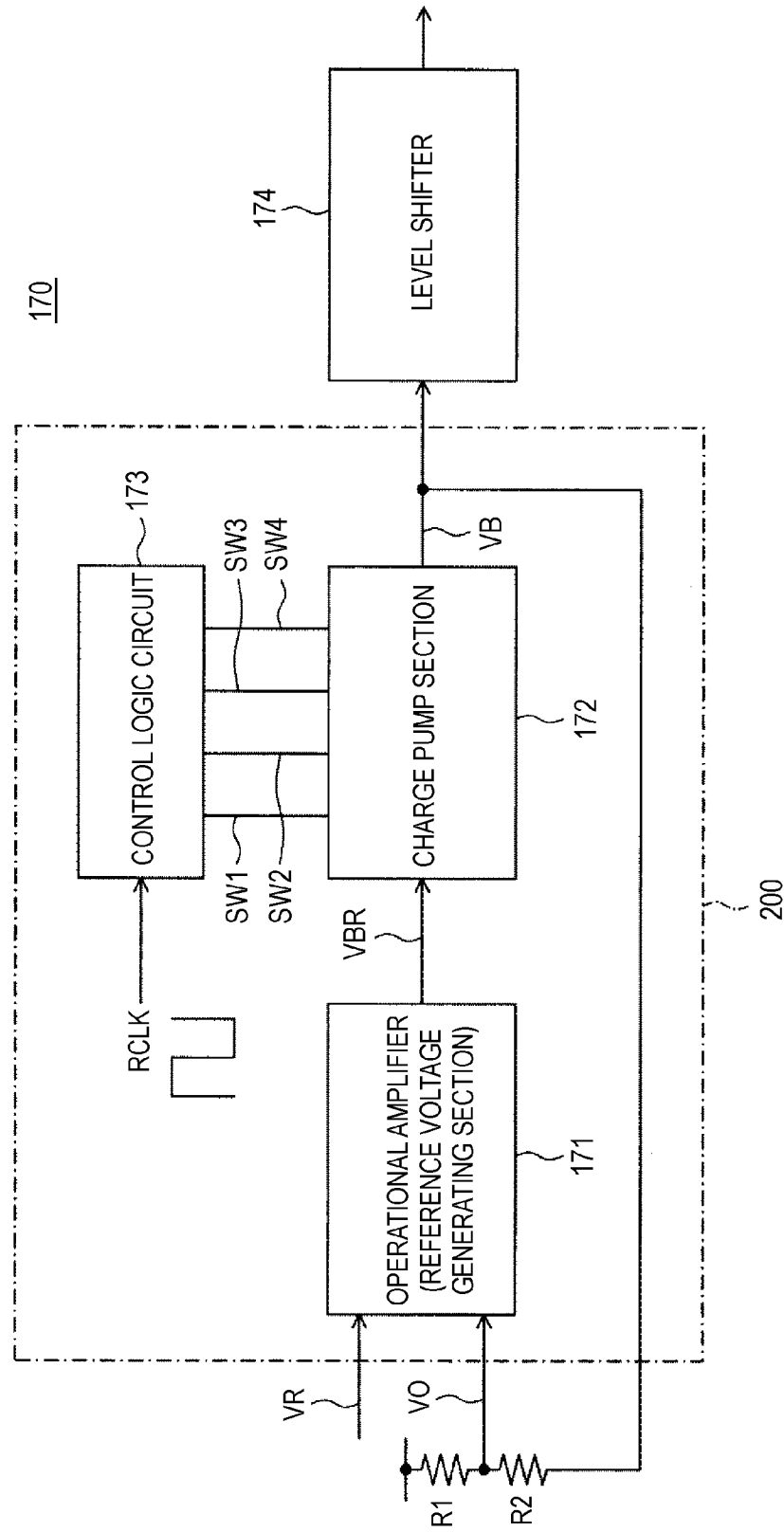
FIG. 3 is a block diagram showing a configurational example of a boosting power supply section according to the embodiment.

FIG. 3 is a block diagram showing a configurational example of the boosting power supply section 170 according to the embodiment.

Figure 4:
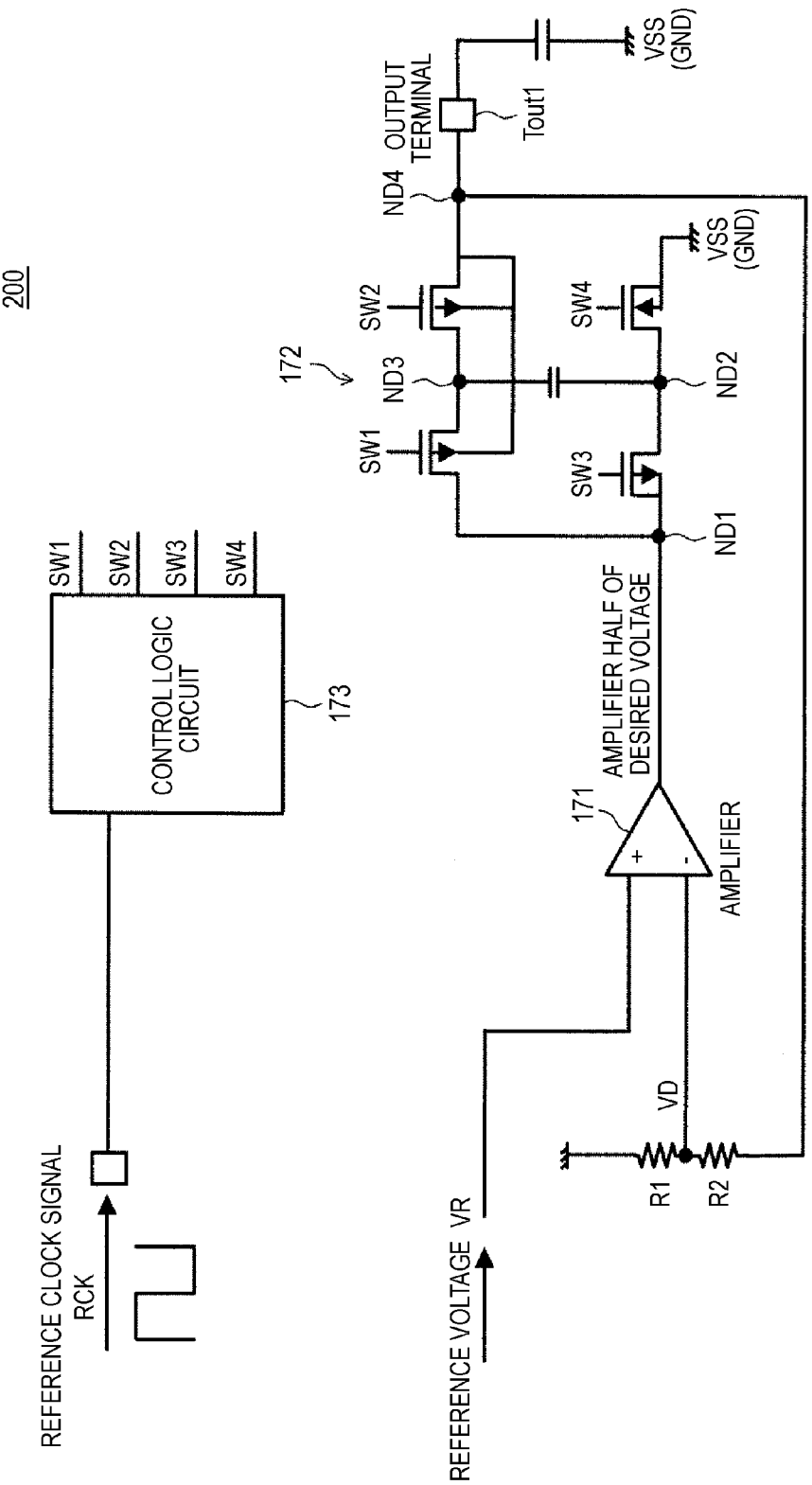
FIG. 4 is a circuit diagram exemplifying the configurations of an operational amplifier and a charge pump section shown in FIG. 3.

FIG. 4 is a circuit diagram exemplifying the configurations of the operational amplifier and the charge pump section shown in FIG. 3.

The boosting power supply section 170 in FIG. 3 has the operational amplifier 171 as a reference voltage generating section, a charge pump section 172, a control logic circuit 173, and a level shifter 174.

Of those components, the operational amplifier 171, the charge pump section 172 and the control logic circuit 173 form a boosting circuit 200 according to the invention. The control logic circuit 173 forms a part of an output-terminal voltage holding section according to the invention.

The level shifter 174 is equivalent to a subsequent-stage circuit of the boosting circuit 200. Although the level shifter 174 is configured to be included in the boosting power supply section 170 in this example, the level shifter 174 may be disposed in the vertical scanning circuit 120.

The boosting power supply section 170 is externally supplied with a supply voltage VDD1 of, for example, 2.7 V.

The operational amplifier 171 as the reference voltage generating section generates a reference voltage VBR for boosting of, for example, 1.8 V which is half the boosted voltage VB of 3.6 V to be boosted, and supplies the generated reference voltage VBR to the charge pump section 172.

The operational amplifier 171 has a non-inverting input terminal (+) supplied with a reference voltage VR, and an inverting input terminal (−) supplied with a voltage VD which is the output terminal voltage of the charge pump section 172 voltage-divided by resistor elements R1, R2.

In FIG. 4, the operational amplifier 171 serves to generate a reference voltage, and is configured so that the output terminal voltage takes a value half the desired boosted potential. The operational amplifier 171 may have a circuit configuration having two simple amplifiers connected together.

For example, the output terminal voltage of the operational amplifier 171 is held at the high-level voltage at the standby time. A configurational example in this case will be explained later.

The charge pump section 172 boosts the output voltage of the operational amplifier 171, e.g., 1.8 V, to 3.6 V through the boosting operation according to the supply level of a switch signal SW1, SW2, SW3, SW4, and supplies the boosted voltage VB to the level shifter 174 by means of the control logic circuit 173.

The charge pump section 172 also outputs the boosted voltage VB to the operational amplifier 171.

While the charge pump section 172 has a function of amplifying the input voltage by two fold, which is not restrictive, it may have a boosting capacitor, a boosting node and a reference node to generate a higher voltage.

As shown in FIG. 4, the charge pump section 172 has p-channel MOS (PMOS) transistors PT1, PT2, PT3, an n-channel MOS (NMOS) transistor NT1, a capacitor C1, and an output terminal Tout1.

The charge pump section 172 further has an input node ND1, a reference node ND2, a boosting node ND3, and an output node ND4.

The charge pump section 172 is configured to include, as switching transistors, PMOS transistors PT1 to PT3 and the NMOS transistor NT1, which are insulated gate field effect transistors.

The input node ND1 is connected to the output of the operational amplifier 171.

The PMOS transistor PT1 has a drain connected to the input node ND1, a source connected to the boosting node ND3, and a gate connected to a supply line from the control logic circuit 173 for the switch signal SW1.

The PMOS transistor PT2 has a drain connected to the boosting node ND3, a source connected to the output node ND4, and a gate connected to a supply line from the control logic circuit 173 for the switch signal SW2.

The PMOS transistor PT3 has a drain connected to the input node ND1, a source connected to the reference node ND2, and a gate connected to a supply line from the control logic circuit 173 for the switch signal SW3.

The NMOS transistor NT1 has a drain connected to the reference node ND2, a source connected to a reference potential VSS, e.g., ground potential GND, and a gate connected to a supply line from the control logic circuit 173 for the switch signal SW4.

The capacitor C1 has a first electrode (first terminal) connected to the boosting node ND3, and a second electrode (second terminal) connected to the reference node ND2.

The output node ND4 is connected to the output terminal Tout1 for the boosted voltage VB, and one end of the resistor element R2.

For example, the voltage at the output terminal Tout1 of the charge pump section 172 is held at a high-level voltage at the standby time. A configurational example in this case will also be explained later.

The control logic circuit 173 generates the switch signals SW1 to SW4 for switching the PMOS transistors PT1 to PT3 and the NMOS transistor NT1 as switching transistors of the charge pump section 172 in response to a reference clock signal RCK.

In standby mode, the control logic circuit 173 sets, for example, the switch signals SW1, SW2 to a low level, the switch signal SW3 to a high level, and the switch signal SW4 to a low level to turn on the switching transistors arranged between the input node of the charge pump section 172 and the output terminal.

Alternatively, in standby mode, the control logic circuit 173 sets, for example, the switch signals SW1 to SW3 to a high level, and the switch signal SW4 to a low level to turn off the switching transistors in the charge pump section 172.

In boosting mode, the control logic circuit 173 first sets the switch signal SW1 to a low level, the switch signal SW4 to a high level, and the switch signals SW2, SW3 to a high level.

As a result, the PMOS transistor PT1 and the NMOS transistor NT1 of the charge pump section 172 are turned on, and the PMOS transistors PT2, PT3 are turned off.

Next, the control logic circuit 173 sets the switch signal SW1 to a high level, the switch signal SW4 to a low level, and the switch signals SW2, SW3 to a low level.

As a result, the PMOS transistor PT1 and the NMOS transistor NT1 of the charge pump section 172 are turned off, and the PMOS transistors PT2, PT3 are turned on.

With the boosted voltage VB supplied by the charge pump section 172 as a high voltage source, the level shifter 174 shifts the level of the input control signal with a low amplitude, e.g., 1.8 V-system, to 3.6 V-system. The level shifter 174 supplies the level-shifted control signal to the vertical scanning circuit 120.

Figure 5:
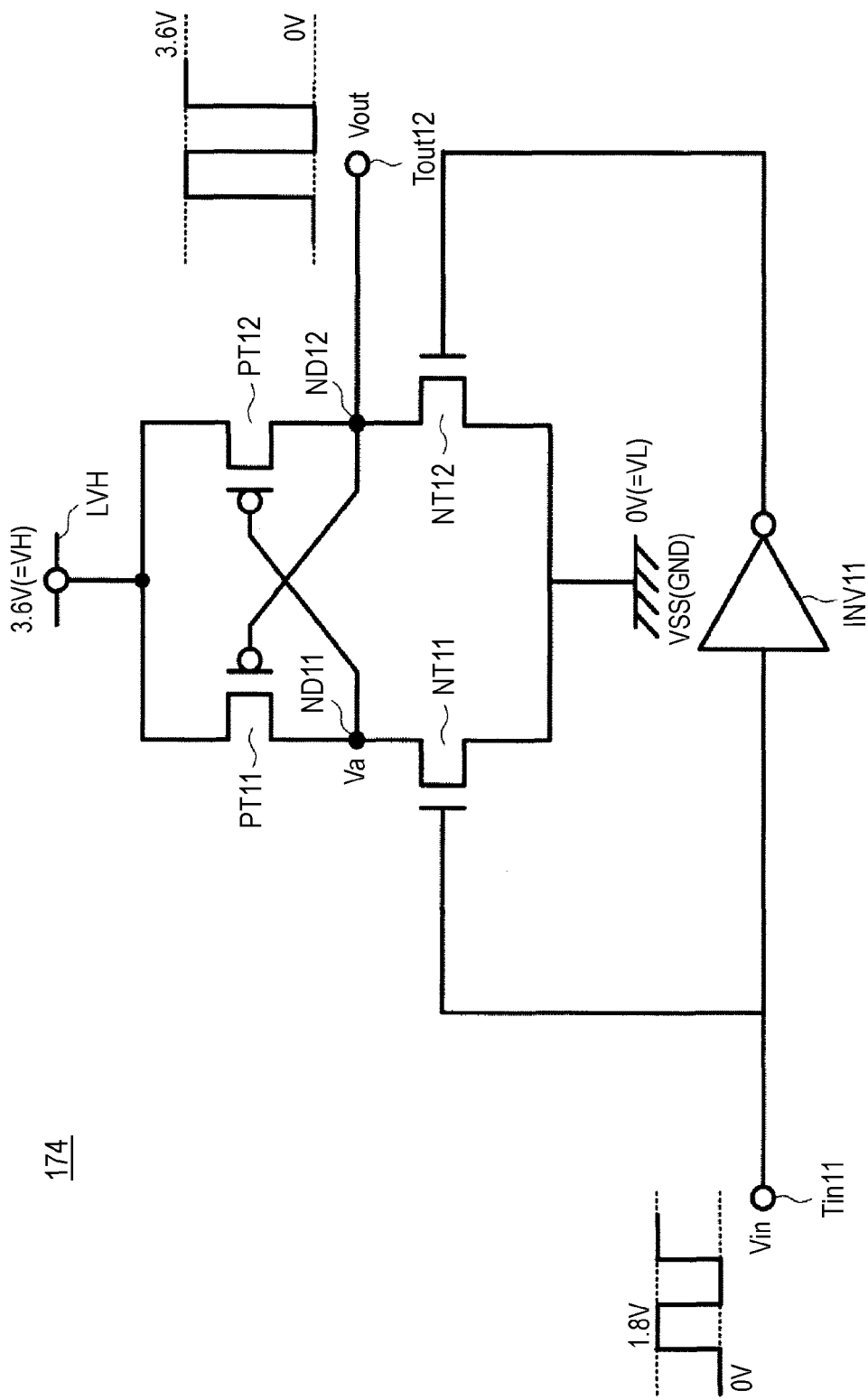
FIG. 5 is a circuit diagram showing a configurational example of a level shifter according to the embodiment.

FIG. 5 is a circuit diagram showing a configurational example of the level shifter 174 according to the embodiment.

The level shifter 174 has PMOS transistors PT11, PT12, NMOS transistors NT11, NT12, an inverter INV11, a supply line LVH for a high voltage VH, an input terminal Tin11, an output terminal Tout11, and nodes ND11, ND12.

The boosted voltage VB from the charge pump section 172 is supplied to the supply line LVH for the high voltage VH.

The source of the PMOS transistor PT11 and the source of the PMOS transistor PT12 are connected to the supply line LVH for the high voltage VH.

The drain of the PMOS transistor PT11 is connected to the drain of the NMOS transistor NT11, and the node therebetween forms the node ND11.

The drain of the PMOS transistor PT12 is connected to the drain of the NMOS transistor NT12, and the node therebetween forms the node ND12.

The source of the NMOS transistor NT11 and the source of the NMOS transistor NT12 are connected to the ground potential GND which is a supply line for a constant voltage VL (0V).

The gate of the PMOS transistor PT11 is connected to the node ND12, and the gate of the PMOS transistor PT12 is connected to the node ND11.

The gate of the NMOS transistor NT11 is connected to the input terminal Tin11, and the gate of the NMOS transistor NT12 is connected to the output of the inverter INV11.

The input of the inverter INV11 is connected to the input terminal Tin11, and the node ND12 is connected to the output terminal Tout11.

When a high-level signal (1.8 V in the illustrated example) is input to the level shifter 174 from the input terminal Tin11, the NMOS transistor NT12 is turned off, and the NMOS transistor NT11 is turned on.

As a result, the charges at the node ND11 are discharged, dropping the gate voltage of the PMOS transistor PT12. Then, the PMOS transistor PT12 is turned on, raising its drain voltage, so that the drain voltage of the PMOS transistor PT11 rises, dropping its drain voltage.

Therefore, the level-shifted high-level signal (e.g., 3.6 V in the illustrated example) Vout is output from the output terminal Tout11.

When a low-level signal (0 V in the illustrated example) is input to the level shifter 174 from the input terminal Tin11, on the other hand, the NMOS transistor NT11 is turned off, and the NMOS transistor NT12 is turned on.

As a result, the charges at the node ND12 are discharged, dropping the drain voltage of the PMOS transistor PT12 and dropping the gate voltage of the PMOS transistor PT11.

Therefore, the drain voltage of the NMOS transistor NT11 or the potential at the node ND11 rises, raising the gate voltage of the PMOS transistor PT12. As a result, the drain voltage of the PMOS transistor PT12 becomes lower, and the low-level signal (e.g., 0 V in the illustrated example) is output from the output terminal Tout11.

The level shifter 174, which is a circuit at the subsequent stage of the boosting circuit 200, is premised on that a high-level (=VH) voltage and a low-level (=VL) voltage are to be supplied stably.

In the transition from the standby state to the operational state, for example, there occurs a time when the high-low relation of the voltages is reversed, which may cause the level shifter to malfunction and an excess through current to flow in the level shifter.

Therefore, the embodiment employs a configuration to be described later to realize a booster circuit which can generate a boosted voltage while suppressing malfunction of subsequent-stage circuits without causing circuit complication and circuit enlargement, and increasing power consumption.

A characteristic configurational example of the boosting circuit 200 according to the embodiment will be described specifically in connection with FIGS. 6 to 14.

First, the operational principle of the charge pump section 172 will be described.

Figure 6:
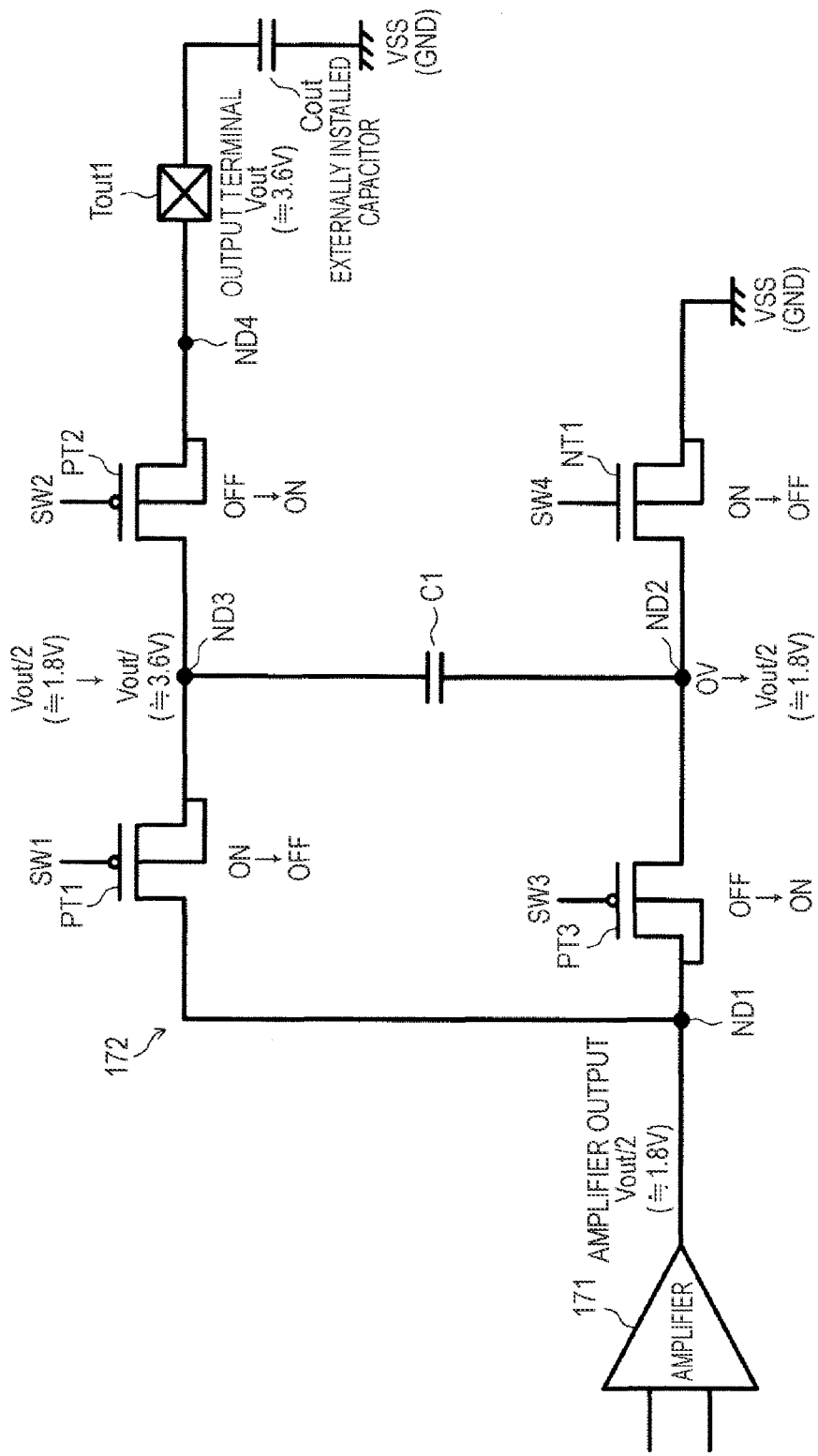
FIG. 6 is a diagram for explaining the operational principle of the charge pump section.

FIG. 6 is a diagram for explaining the operational principle of the charge pump section 172.

This description will be given of an example where the output voltage of the operational amplifier 171 is 1.8 V.

In boosting mode, the control logic circuit 173 sets the switch signal SW1 to a low level, the switch signal SW4 to a high level, and the switch signals SW2, SW3 to a high level.

This turns the PMOS transistor PT1 and the NMOS transistor NT1 of the charge pump section 172 on, and turns the PMOS transistors PT2, PT3 off.

Accordingly, the voltages of both electrodes (terminals) of the capacitor C1 are respectively charged to 1.8 V and 0 V. That is, the node ND3 is charged to 1.8 V, and the node ND2 is charged to 0 V.

Next, the control logic circuit 173 sets the switch signal SW1 to a high level, the switch signal SW4 to a low level, and the switch signals SW2, SW3 to a low level.

This turns the PMOS transistor PT1 and the NMOS transistor NT1 of the charge pump section 172 off, and turns the PMOS transistors PT2, PT3 on.

Accordingly, the potential states of both terminals of the capacitor C1 are respectively charged to 3.6 V and 1.8 V. That is, with the voltage of 1.8 V supplied to the node ND2, the potential of the node ND3 is boosted (pulled up to 1.8 V or higher by the capacitive coupling of the capacitor C1.

Finally, the potential to be charged in the capacitor C1 ideally becomes 3.6 V which is twice the output voltage of the operational amplifier 171.

The whole charge pump section 172 can be configured to be operable on the externally supplied supply voltage VDD1 of, for example, 2.7 V, and the generated voltage of 3.6 V can be supplied to other circuit blocks, e.g., the level shifter 174, to be used as a new supply voltage.

Given that the voltage of the output terminal Tout1 of the boosting circuit 200 is held at the high level at the standby time, if the initial voltage before initiating the operation of the charge pump is kept high, the time to reach the desired voltage can be shortened in the transition from the standby time to the operational time.

As the voltage of the output terminal Tout1 is held (suspended) at the high level at the standby time, the high-low relation of the voltages is not reversed in the level shifter 174 at the subsequent stage, which is the circuit to use the boosted voltage generated, making it possible to prevent malfunction of the level shifter 174 and the flow of the through current.

A countermeasure against the malfunction and the flow of the through current will be described below by way of first to fifth examples.

<3. First Example>

Figure 7:
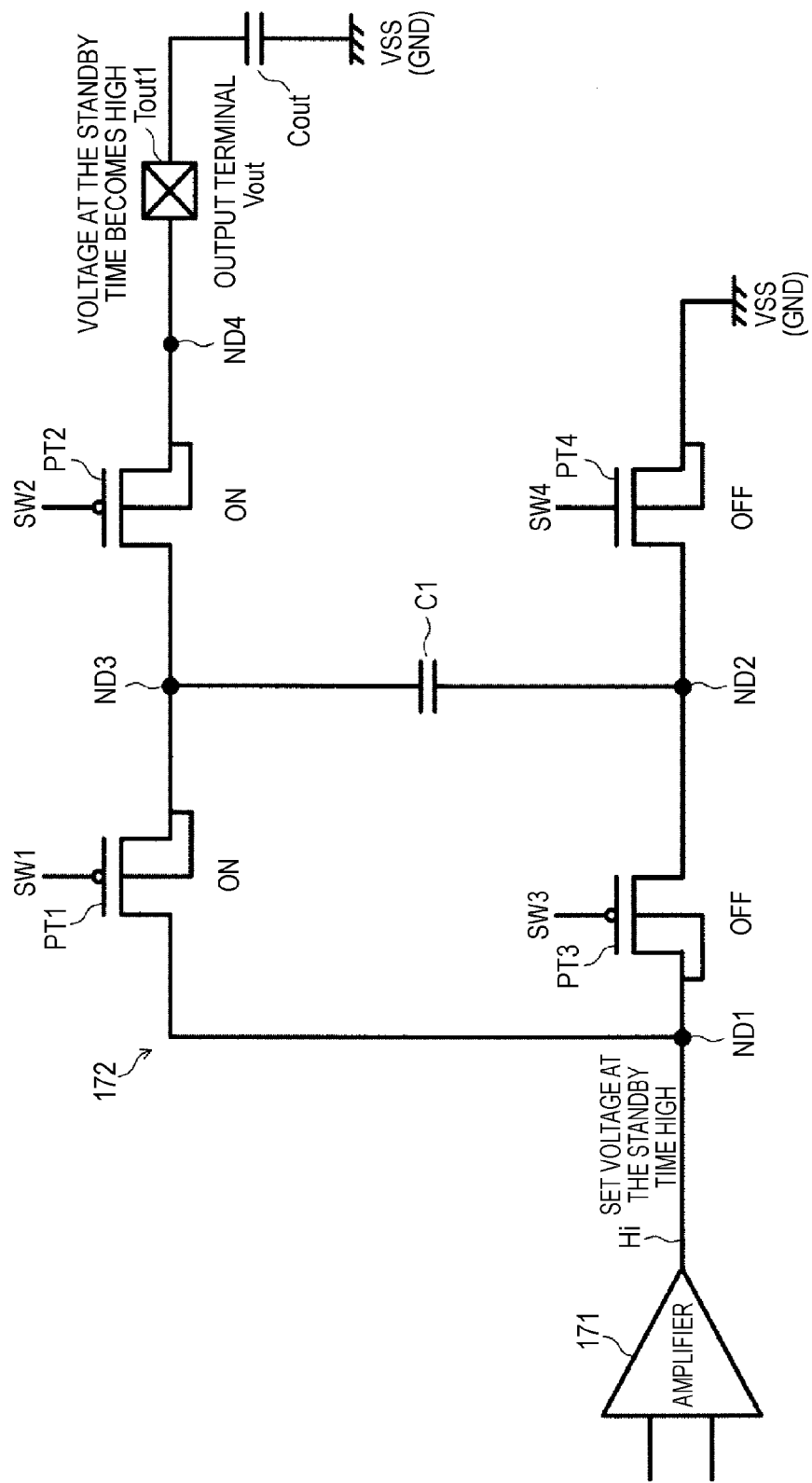
FIG. 7 is a diagram for explaining a first example for preventing the malfunction and through current of the booster circuit according to the embodiment.

FIG. 7 is a diagram for explaining a first example for preventing the malfunction and through current of the booster circuit 200 according to the embodiment.

The first example shown in FIG. 7 takes the following configuration to hold the voltage of the output terminal Tout1 of the boosting circuit 200 at the standby time to a voltage on the high level (Hi) side (e.g., 2.7 V).

At the standby time, the output of the operational amplifier 171 is held at the high level.

Then, to electrically enable the nodes ND1 and ND4 of the charge pump section 172, the PMOS transistors PT1, PT2 are turned on, and the PMOS transistor PT3 and the NMOS transistor NT1 are turned off.

In this case, the control logic circuit 173 sets the switch signals SW1, SW2 to a low level, the switch signal SW3 to a high level, and the switch signal SW4 to a low level.

Holding the output of the operational amplifier 171 at the high level at the standby time is feasible by connecting the output terminal output terminal of the operational amplifier 171 to the power supply side in response to a standby signal STBY using, for example, an MOS switch.

Implementation examples will be described below in connection with FIGS. 8 and 9.

Figure 8:
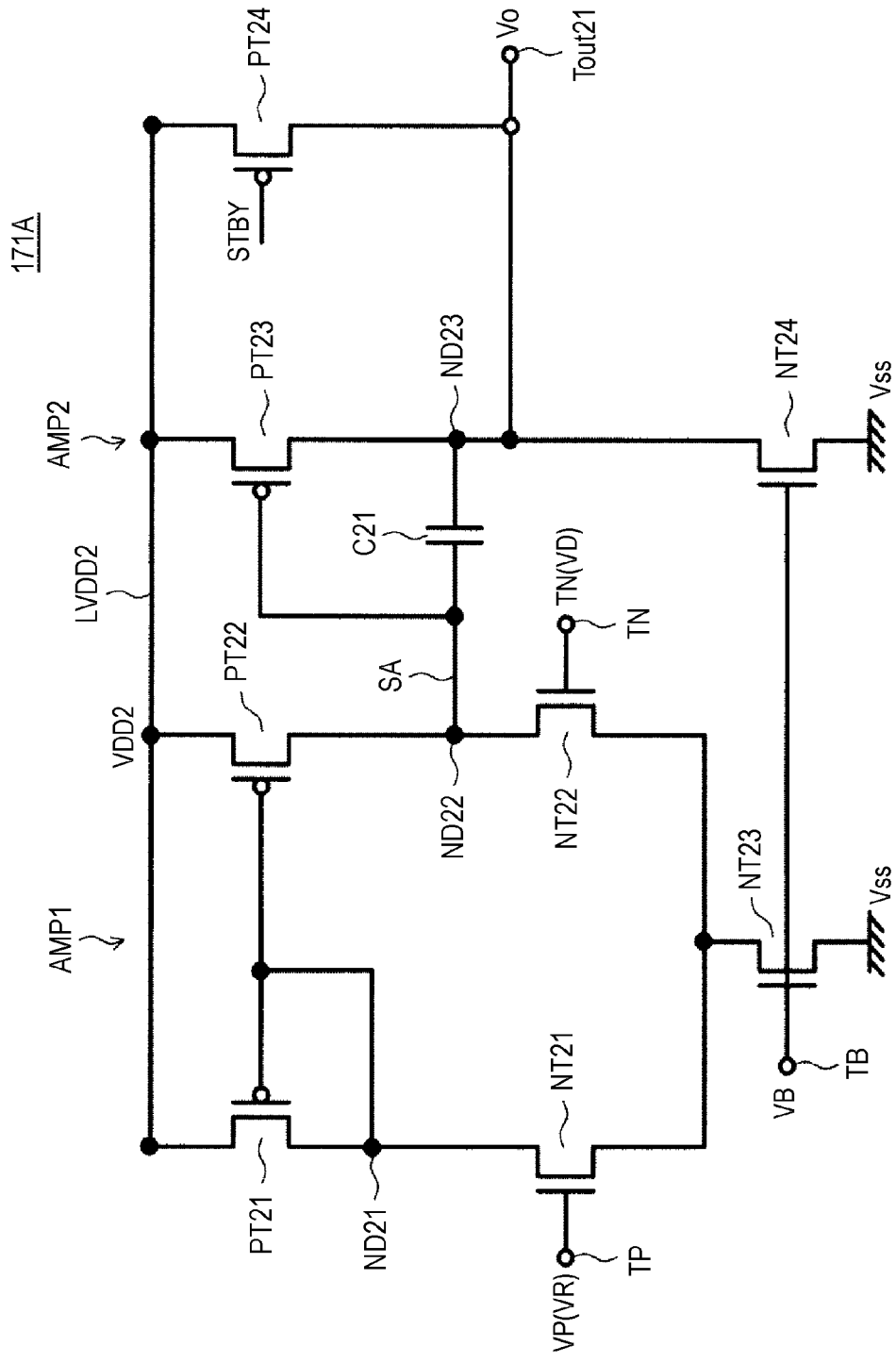
FIG. 8 is a diagram for explaining a first implementation example of an operational amplifier corresponding to the first example according to the embodiment.

FIG. 8 is a diagram for explaining a first implementation example of the operational amplifier corresponding to the first example according to the embodiment.

An operational amplifier 171A in FIG. 8 is configured to have a differential amplifier AMP1 and an output amplifier AMP2 in two stages.

The operational amplifier 171A has PMOS transistors PT21 to PT24, NMOS transistors NT21 to NT24, a capacitor C21, nodes ND21 to ND23, an input terminals TP, TN, a bias terminal TB, and an output terminal Tout21.

The PMOS transistor PT24 serves as an MOS switch in an output-terminal voltage holding section which holds the output of the operational amplifier 171A to a high level.

The differential amplifier AMP1 at the first stage is formed by the PMOS transistors PT21, PT22, the NMOS transistors NT21 to NT23, and the nodes ND21, ND22.

The sources of the PMOS transistors PT21 and PT22 are connected to a supply line LVDD2 for a supply voltage VDD2.

The drain of the PMOS transistor PT21 is connected to the drain of the NMOS transistor NT21, and the node therebetween forms the node ND21. The node ND21 is connected to the gates of the PMOS transistors PT21, PT22.

The drain of the PMOS transistor PT22 is connected to the drain of the NMOS transistor NT22, and the node therebetween forms the node ND22.

The sources of the NMOS transistors NT21 and NT22 are connected together, and a node therebetween is connected to the drain of the NMOS transistor NT23, and the source of the NMOS transistor NT23 is connected to the reference potential VSS (e.g., ground potential GND).

The gate of the NMOS transistor NT21 is connected to the input terminal TP for a voltage VP, and the gate of the NMOS transistor NT22 is connected to the input terminal TN for a voltage VN. The gate of the NMOS transistor NT23 is connected to the bias terminal TB to which a bias voltage VB is supplied.

For example, the reference voltage VR in FIGS. 3 and 4 is supplied to the input terminal TP as the voltage VP. The voltage-divided voltage VD in FIGS. 3 and 4 is supplied to the input terminal TN as the voltage VN.

The NMOS transistor NT23 serves as a current source for the differential amplifier AMP1 at the first stage.

The output amplifier AMP2 is formed by the PMOS transistor PT23, the NMOS transistor NT24, the capacitor C21 and the node ND23.

The source of the PMOS transistor PT23 is connected to the supply line LVDD2 for the supply voltage VDD2.

The drain of the PMOS transistor PT23 is connected to the drain of the NMOS transistor NT24, and the node therebetween forms the node ND23. The source of the NMOS transistor NT24 is connected to the reference potential VSS (e.g., ground potential GND).

The capacitor C21 has a first electrode connected to the node ND22 or the output node of the differential amplifier AMP1, and a second electrode connected to the node ND23. The node ND23 is connected to the output terminal Tout21.

The gate of the PMOS transistor PT23 is connected to the node ND22 or the output node of the differential amplifier AMP1, and the drain of the PMOS transistor PT23 is connected to the node ND23.

The gate of the NMOS transistor NT24 is connected to the bias terminal TB to which the bias voltage VB is supplied.

The NMOS transistor NT24 serves as a current source for the output amplifier AMP2.

The PMOS transistor PT24 has a source connected to the supply line LVDD2 for the supply voltage VDD2, a drain connected to the output terminal Tout21, and a gate supplied to the supply line for the standby signal STBY.

In the operational amplifier 171A, in standby mode, the standby signal STBY is supplied in an active low level. As a result, the PMOS transistor PT24 is turned on, connecting the output terminal Tout21 of the operational amplifier 171A to the supply line LVDD2 for the supply voltage VDD2.

Accordingly, to hold the output of the operational amplifier 171A at the high level at the standby time, the output terminal Tout21 of the operational amplifier 171A is connected to the power supply side via the PMOS transistor PT24 as an MOS switch in response to the standby signal STBY.

At this time, to electrically enable the nodes ND1 and ND4 of the charge pump section 172, the PMOS transistors PT1, PT2 are turned on, and the PMOS transistor PT3 and the NMOS transistor NT1 are turned off.

This causes the voltage at the output terminal Tout1 of the boosting circuit 200 at the standby time is held at a high-level (Hi) voltage.

Consequently, the malfunction of the level shifter 174 at the subsequent stage and the through current can be prevented without reversing the high-low relation of the voltages.

In standby mode, sopping the supply of the bias voltage VB can reduce the power consumption at the standby time.

In boosting mode, the standby signal STBY is supplied in an inactive high level. Consequently, the PMOS transistor PT24 is turned off. Accordingly, the output terminal Tout21 of the operational amplifier 171A is electrically disconnected from the supply line LVDD2 for the supply voltage VDD2.

In boosting mode, the supply of the bias voltage VB is started.

Accordingly, the differential amplifier AMP1 amplifies a signal corresponding to the difference between the input voltages VP, VN, yielding an amplified signal SA, which is supplied to the output amplifier AMP2 at the output stage from the node ND22.

In the output amplifier AMP2, the ON state of the PMOS transistor PT23 is controlled according to the level of the amplified signal SA to hold the potential at the output terminal Tout21 at, for example, 1.8 V.

Next, a second implementation example of the operational amplifier corresponding to the first example according to the embodiment will be described.

Figure 9:
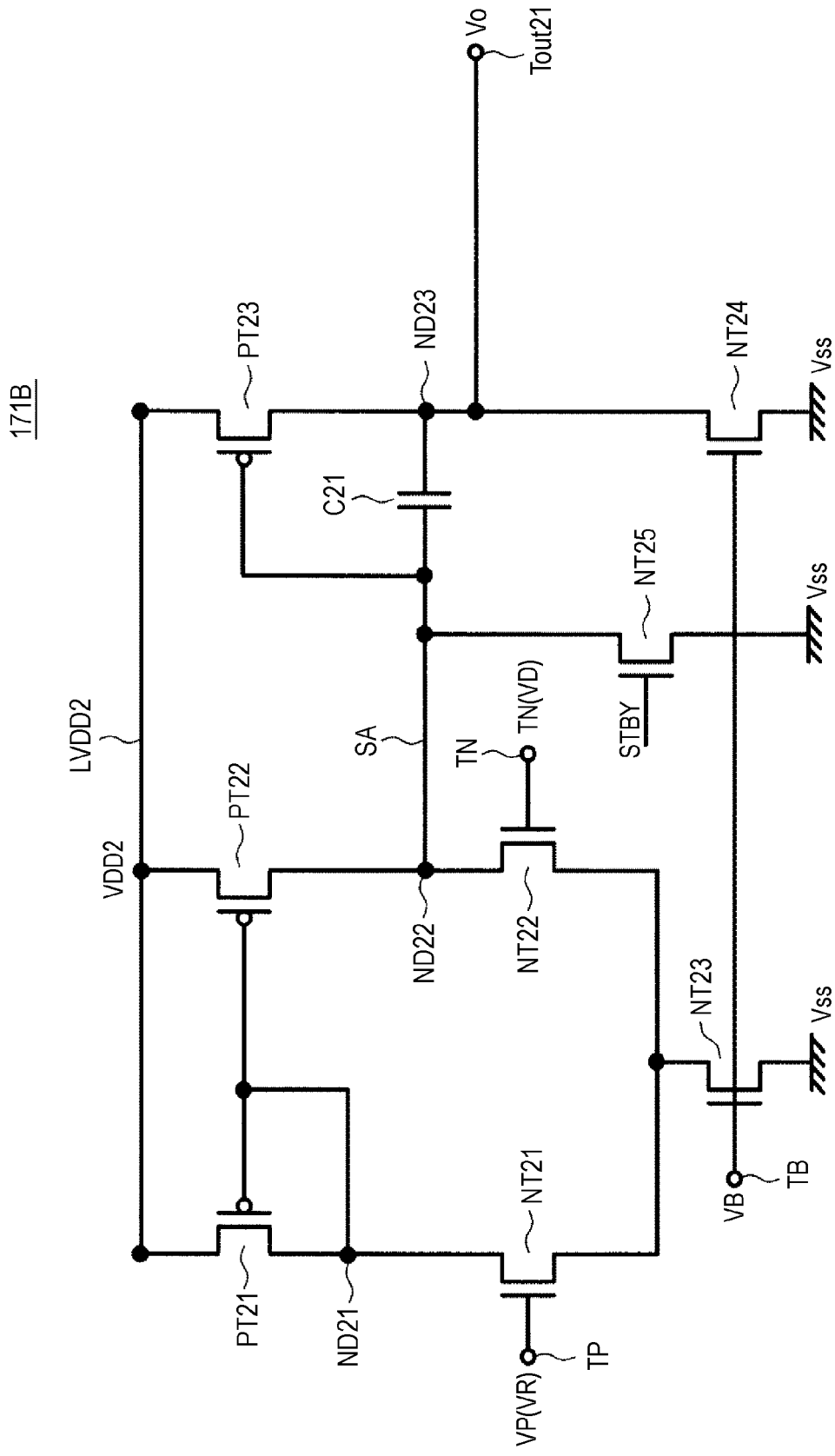
FIG. 9 is a diagram for explaining a second implementation example of the operational amplifier corresponding to the first example according to the embodiment.

FIG. 9 is a diagram for explaining the second implementation example of the operational amplifier corresponding to the first example according to the embodiment.

In an operational amplifier 171B according to the second implementation example, unlike the first implementation example in FIG. 8, an MOS switch is formed by an NMOS transistor NT25 connected between the node ND22 and the reference potential VSS.

The drain of the NMOS transistor NT25 is connected to the first electrode of the capacitor C21 and the gate of the PMOS transistor PT23 of the output amplifier AMP2. The NMOS transistor NT25 has a source connected to the reference potential VSS (e.g., ground potential GND), and a gate connected to the supply line for the high-level active standby signal STBY.

As the NMOS transistor NT25 is turned on at the standby time, the gate potential of the PMOS transistor PT23 in the output amplifier AMP2 is set to a low level.

As a result, the PMOS transistor PT23 is turned on to connect the output terminal Tout21 of the operational amplifier 171B to the supply line LVDD2 for the supply voltage VDD2.

At this time, to electrically enable the nodes ND1 and ND4 of the charge pump section 172, the PMOS transistors PT1, PT2 are turned on, and the PMOS transistor PT3 and the NMOS transistor NT1 are turned off.

This causes the voltage at the output terminal Tout1 of the boosting circuit 200 at the standby time to be held at a high-level (Hi) voltage.

Consequently, the malfunction of the level shifter 174 at the subsequent stage and the through current can be prevented without reversing the high-low relation of the voltages.

In boosting mode, the standby signal STBY is supplied in an inactive low level. As a result, the NMOS transistor NT25 is turned off. Accordingly, the output terminal Tout21 of the operational amplifier 171B is electrically disconnected from the supply line LVDD2 for the supply voltage VDD2.

Because the amplification process is carried out in the same manner as described above, its description is omitted.

Next, a second example for preventing the malfunction and through current of the booster circuit 200 according to the embodiment will be described.

<4. Second Example>

Figure 10:
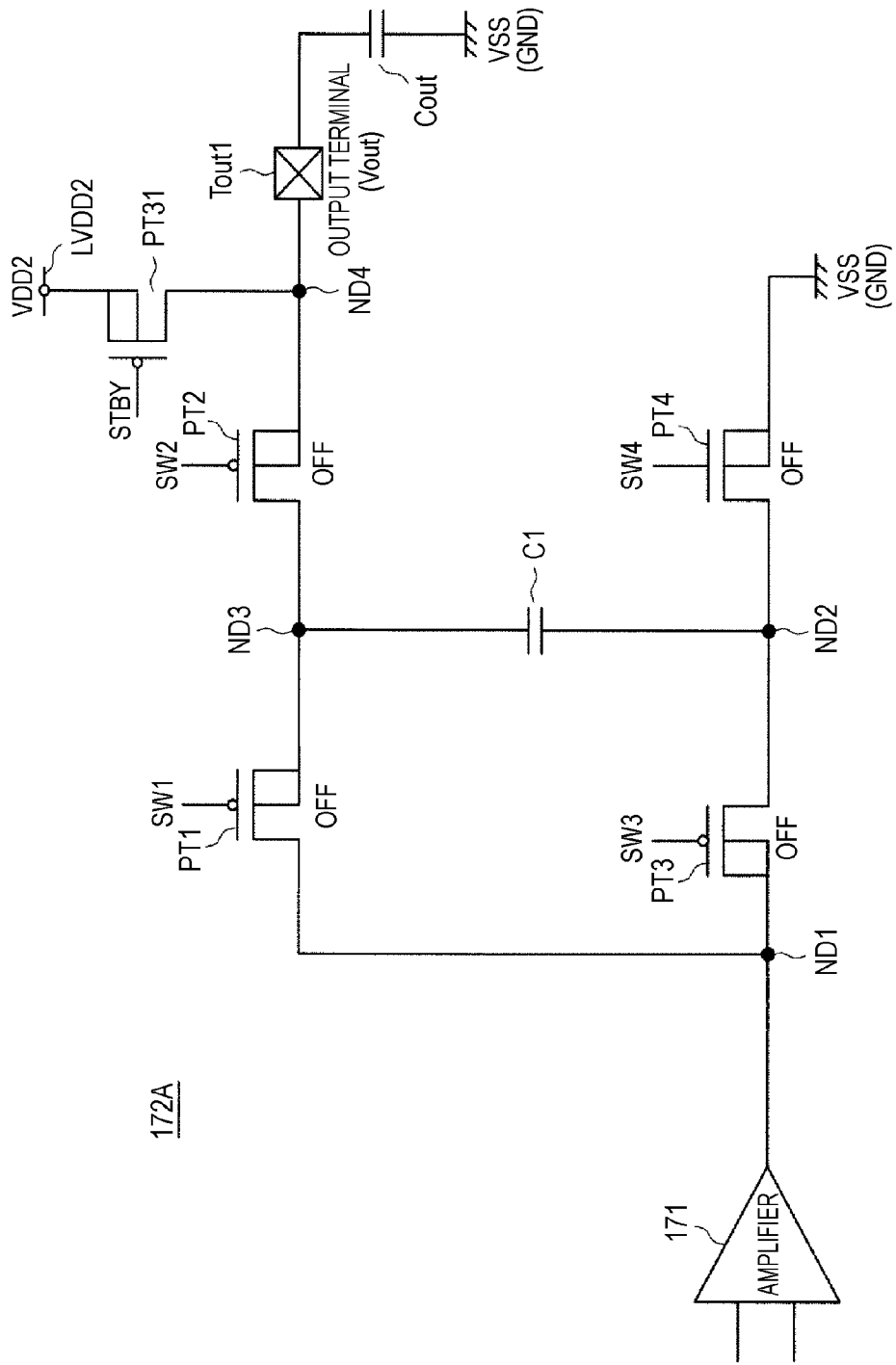
FIG. 10 is a diagram for explaining a second example for preventing the malfunction and through current of the booster circuit according to the embodiment.

FIG. 10 is a diagram for explaining the second example for preventing the malfunction and through current of the booster circuit 200 according to the embodiment.

In the foregoing first example, the output terminal of the operational amplifier 171 is held at the high level to turn on the PMOS transistors PT1, PT2 of the charge pump section 172 at the standby time, thereby holding the voltage at the output terminal Tout1 of the booster circuit 200 at the high level side.

In the second example in FIG. 10, by way of contrast, the booster circuit 200 is configured in such a way as to turn off the PMOS transistors PT1 to PT3 and the NMOS transistor NT1 in a charge pump section 172A and directly connect the output terminal Tout1 of the booster circuit 200 to the power supply side.

In the example in FIG. 10, an MOS switch which forms the output-terminal voltage holding section is formed by a PMOS transistor PT31.

Then, the PMOS transistor PT31 has a source connected to the supply line LVDD2 for the supply voltage VDD2, and a drain connected to the node ND4 of the charge pump section 172A. The gate of the PMOS transistor PT31 is connected to the supply line for the low-level active standby signal STBY.

In the charge pump section 172A, in standby mode, the standby signal STBY is supplied in an active low level. As a result, the PMOS transistor PT31 is turned on, connecting the output terminal Tout1 of the booster circuit 200 to the supply line LVDD2 for the supply voltage VDD2.

Accordingly, to hold the output of the booster circuit 200 at the high level at the standby time, the output terminal Tout1 is connected to the power supply side via the PMOS transistor PT31 as an MOS switch in response to the standby signal STBY.

At this time, the PMOS transistors PT1, PT2, PT3 and the NMOS transistor NT1 in the charge pump section 172A are turned off.

This causes the voltage at the output terminal Tout1 of the boosting circuit 200 at the standby time is held at a high-level (Hi) voltage.

As a result, the malfunction of the level shifter 174 at the subsequent stage and the through current can be prevented without reversing the high-low relation of the voltages.

Next, a third example for preventing the malfunction and through current of the booster circuit 200 according to the embodiment will be described.

<5. Third Example>

Figure 11:
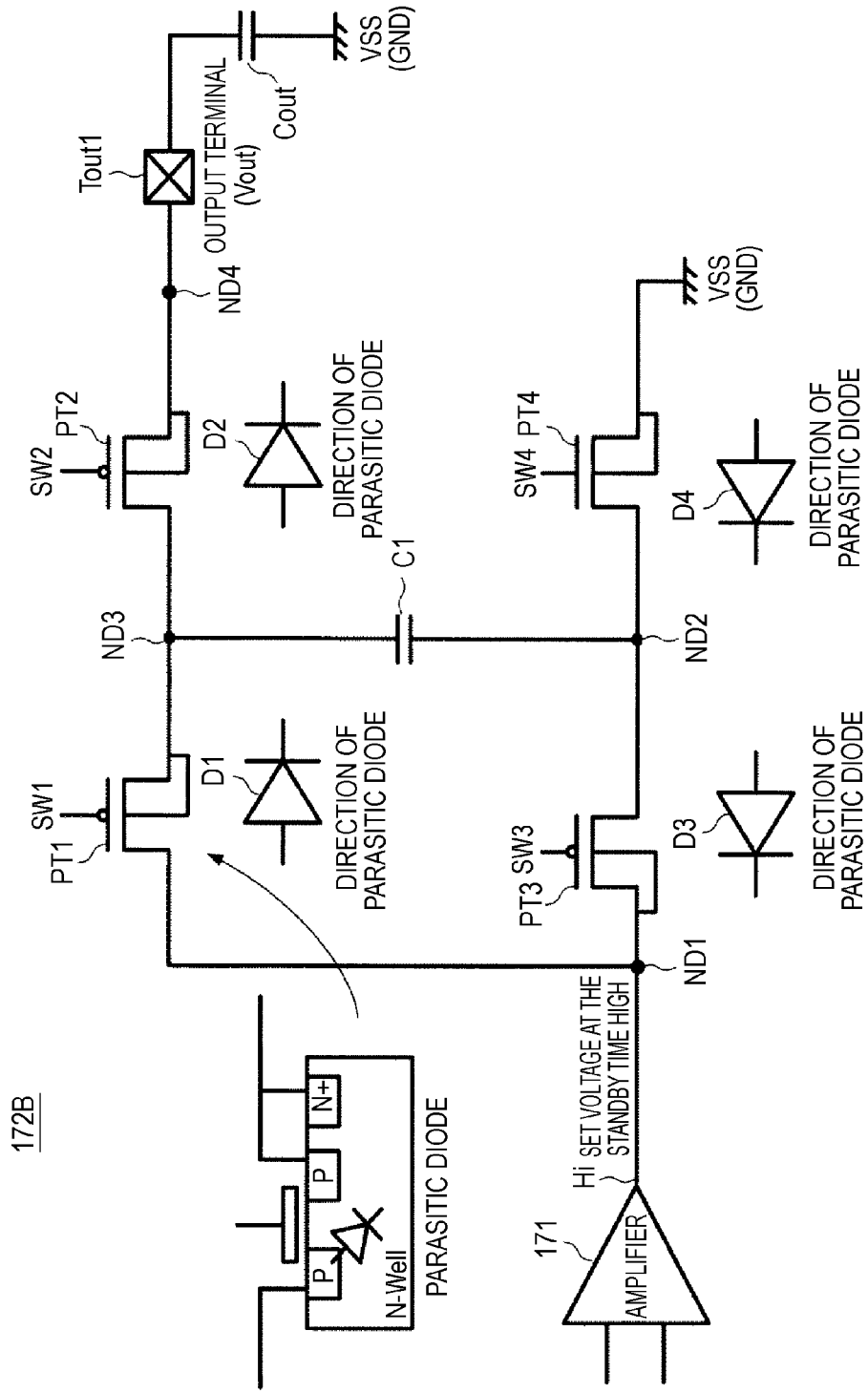
FIG. 11 is a diagram for explaining a third example for preventing the malfunction and through current of the booster circuit according to the embodiment.

FIG. 11 is a diagram for explaining the third example for preventing the malfunction and through current of the booster circuit 200 according to the embodiment.

The third example differs from the first example in that the PMOS transistors PT1, PT2, PT3 and the NMOS transistor NT1 as all the switches in a charge pump section 172B are turned off.

The third example also differs from the first example in the use of parasitic diodes D1 to D4 of the PMOS transistors PT1, PT2, PT3 and the NMOS transistor NT1.

In the first example, the PMOS transistors PT1, PT2 as switches in the charge pump section 172 are turned on to electrically connect the nodes ND1 and ND4 together.

When the potential state of the output terminal Tout1 of the booster circuit 200 changes, therefore, there still remains a possibility that the current counterflows toward the inside the booster circuit 200 from the outside thereof.

In the second example, the counterflow of the current may occur depending on the potential state of the output terminal.

In the third example, therefore, the circuit configuration of the charge pump section 172B uses the parasitic diodes D1 to D4 of the PMOS transistors PT1, PT2, PT3 and the NMOS transistor NT1 as shown in FIG. 11.

The PMOS transistor PT1 is connected in such a way that the forward direction of the parasitic diode D1 is from the input node ND1 toward the boosting node ND3.

The PMOS transistor PT2 is connected in such a way that the forward direction of the parasitic diode D2 is from the boosting node ND3 toward the output node ND4.

The PMOS transistor PT3 is connected in such a way that the forward direction of the parasitic diode D3 is from the reference node ND2 toward the input node ND1.

The NMOS transistor NT1 is connected in such a way that the forward direction of the parasitic diode D4 is from the ground potential GND side toward the reference node ND2.

With the above configuration, at the standby time, the output of the operational amplifier 171 is connected to (suspended at) the power supply side (e.g., 2.7 V) by means of the measure used in the first example.

Further, the PMOS transistors PT1, PT2, PT3 and the NMOS transistor NT1 as the switches in the charge pump section 172B are turned off.

According, as shown in FIG. 11, the directions of the parasitic diodes D1 to D4 of the PMOS transistors PT1, PT2, PT3 and the NMOS transistor NT1 as the switches can allow the output terminal voltage of the boosted voltage to be held at the high level even at the standby time.

Furthermore, because all of the PMOS transistors PT1, PT2, PT3 and the NMOS transistor NT1 as the switches in the charge pump section 172B are off, the current does not flow from the output terminal Tout1.

Next, a fourth example for preventing the malfunction and through current of the booster circuit 200 according to the embodiment will be described.

<6. Fourth Example>

Figure 12:
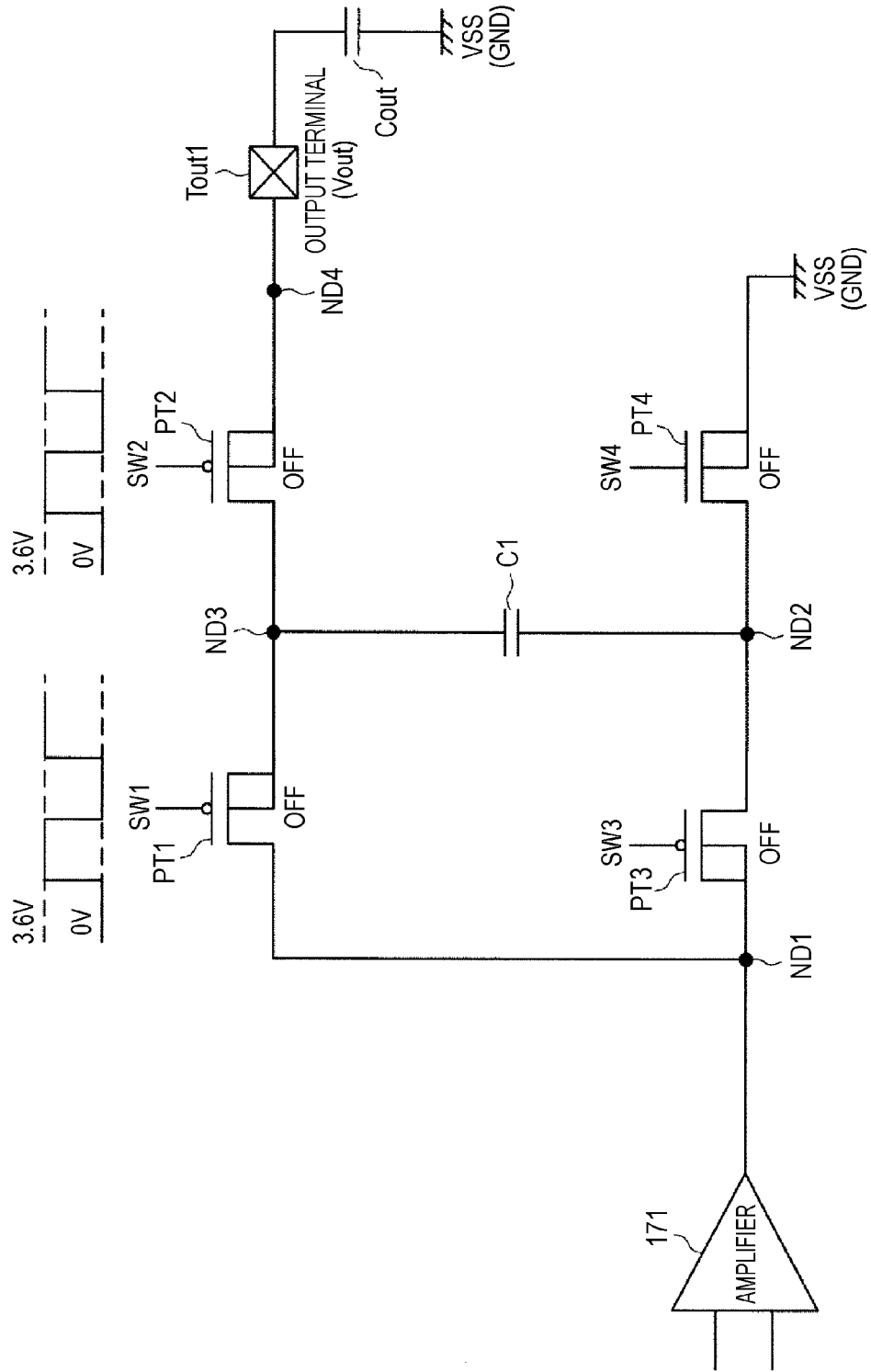
FIG. 12 is a diagram for explaining a fourth example for preventing the malfunction and through current of the booster circuit according to the embodiment.

FIG. 12 is a diagram for explaining the fourth example for preventing the malfunction and through current of the booster circuit 200 according to the embodiment.

The fourth example differs from the second and third examples in that a boosted voltage Vout (3.6 V in the embodiment) is used as an OFF voltage for at least the PMOS transistors PT1, PT2 among the switches in the charge pump section 172.

For example, attention is paid to the PMOS transistor PT2 connected between the boosting node ND3 and the output node ND4.

If the supply voltage externally supplied as the OFF voltage for the PMOS transistor PT2, e.g., 2.7 V, is used as it is, when charging to a capacitor Cout installed externally progresses and the boosted voltage Vout rises, as shown in FIG. 11, there may be a case where the PMOS transistor PT2 cannot be turned off completely.

This may cause a reduction in charge pump efficient and an increase in standby current.

In this respect, the operation of turning off the PMOS transistor PT2 with the boosted voltage (=Vout) can cause the PMOS transistor PT2 to be surely turned off, making it possible to reduce the leak current.

The same is true of the case where attention is paid to the PMOS transistor PT1 connected between the input node ND1 and the boosting node ND3.

Implementation examples will be described in connection with FIGS. 13 and 14.

Figure 13:
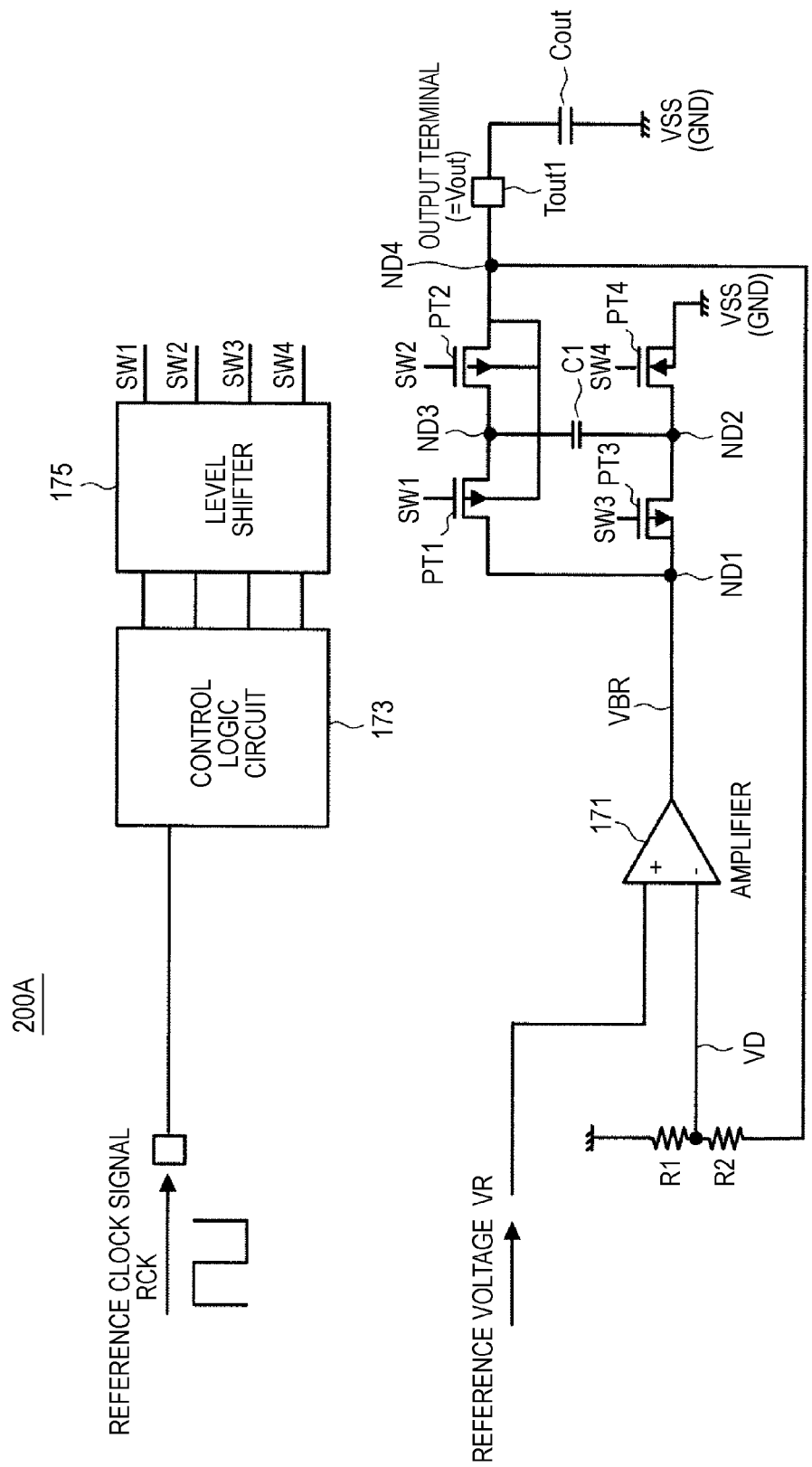
FIG. 13 is a diagram for explaining a first implementation example of a booster circuit corresponding to the fourth example according to the embodiment.

FIG. 13 is a diagram for explaining a first implementation example of the booster circuit corresponding to the fourth example according to the embodiment.

In a booster circuit 200B in FIG. 13, a level shifter 175 is provided at the output stage of the switch signals SW1 to SW4 of the control logic circuit 173.

The level shifter 175, like the level shifter 174, is supplied with, as a high-level voltage, the boosted voltage from the booster circuit which allows the output terminal Toutl to be held at the high level. Therefore, occurrence of the malfunction of the level shifter 175 and the through current are prevented as described above.

Figure 14:
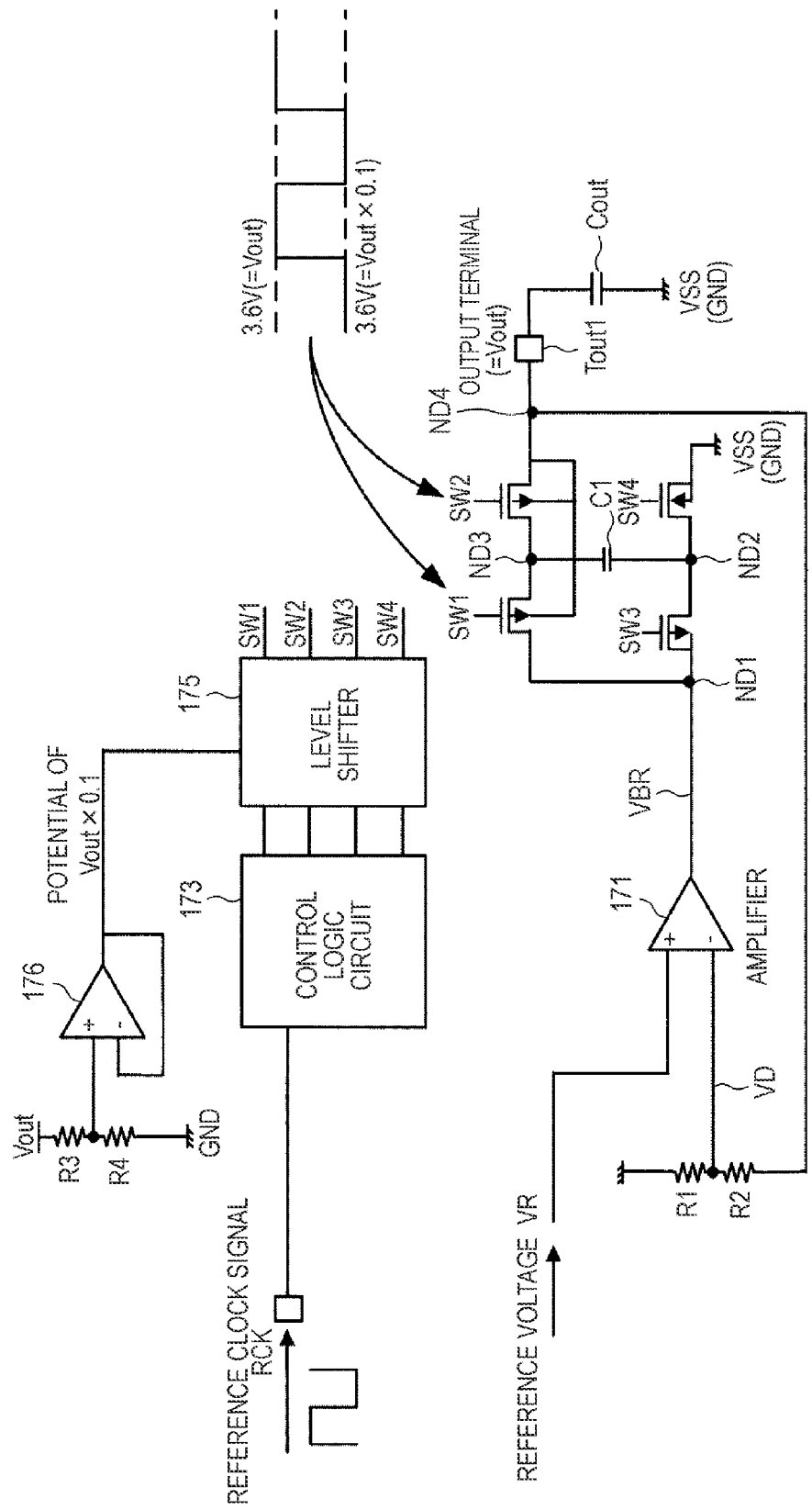
FIG. 14 is a diagram for explaining a second implementation example of the booster circuit corresponding to the fourth example according to the embodiment.

FIG. 14 is a diagram for explaining a second implementation example of the booster circuit corresponding to the fourth example according to the embodiment.

The second implementation example of the booster circuit is configured in such a way that the gate oxide films of the PMOS transistors PT1, PT2 are protected by changing the ON voltage of the PMOS transistors PT1, PT2 according to the potential state of the output terminal Tout1.

Given that a voltage voltage-divided by resistor elements R11, R12 connected in series between a supply line LVout for the boosted voltage Vout and the ground potential GND is taken as a reference, the level shifter 175 is controlled so that the ON voltage becomes the potential of 10% (0.1) of the output voltage Vout of an operational amplifier 176.

In this example, the OFF voltage is controlled to be 3.6 V and the ON voltage is controlled to be 10% of 3.6 V or 0.36 V.

As the ON voltage of the PMOS transistors PT1, PT2 is controlled to normally take the of 10% of the voltage at the output terminal Tout1, it is possible to prevent each terminal voltage from becoming excessively large, leading to an improvement of the reliability.

As described above, the embodiment can obtain the following advantages.

The provision of the booster circuit inside an LSI is useful in that in addition to the externally supplied voltages, multiple types of supply voltages can be used in the internal circuits.

In case of an image sensor, particularly, if the pixels can be driven with multiple types of supply voltages, the flexibility in improving the image quality can be enhanced.

Further, the boosted voltage can be generated without causing malfunction of a circuit at a subsequent stage, which is useful in improving the quality of the products and lowering the power consumption caused by the reduced leak current in terms of the reliability.

Further, the simple configuration using parasitic diodes does not need a special circuit configuration and reduces the chip area.

The CMOS image sensor according to each embodiment, which is not particularly limited, can be configured to have, for example, a column parallel ADC (Analog Digital Converter) mounted therein.

<7. Second Embodiment>

Figure 15:
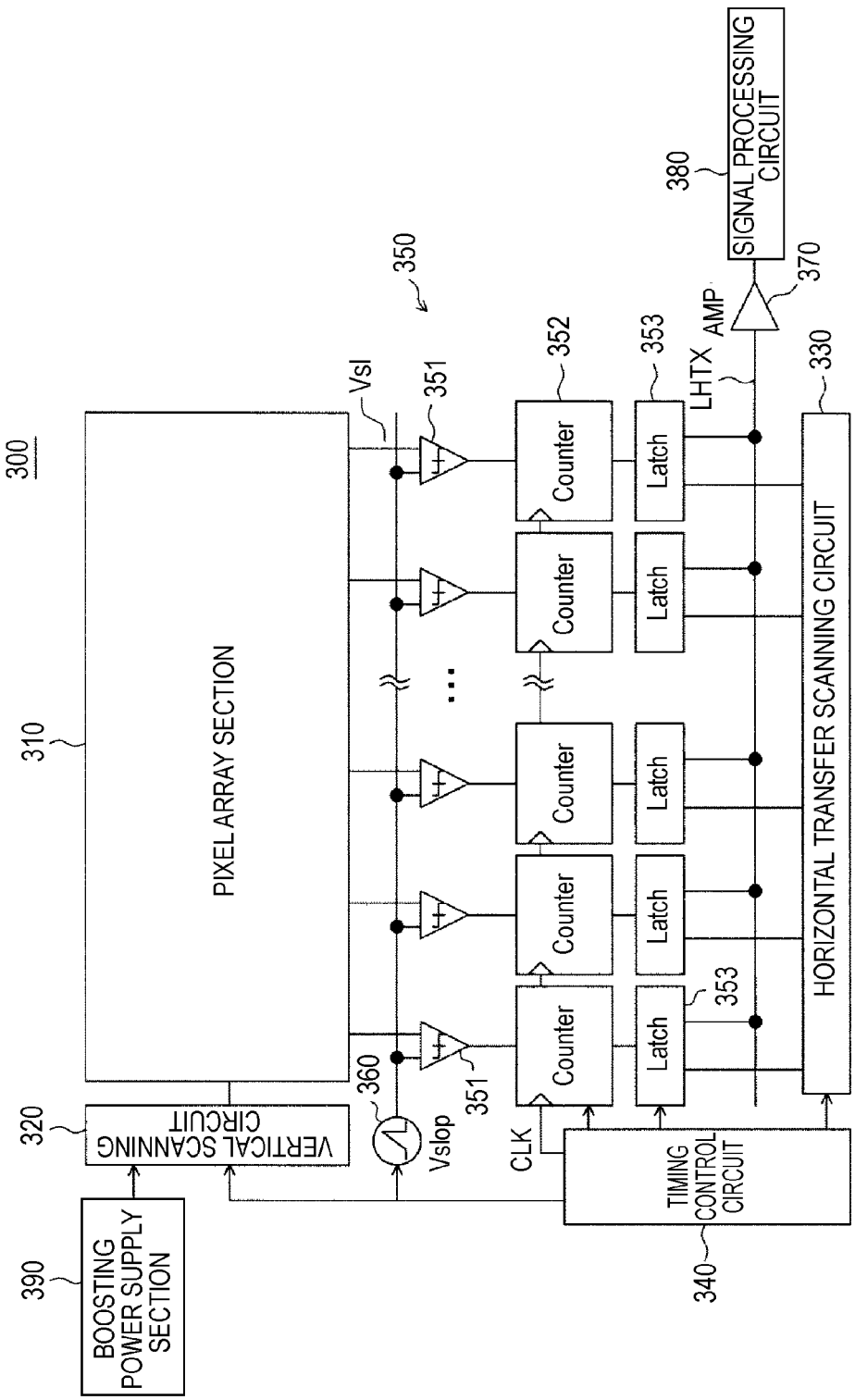
FIG. 15 is a block diagram showing a configurational example of a solid-state imaging device with a column parallel ADC mounted therein (CMOS image sensor) according to a second embodiment of the invention.

FIG. 15 is a block diagram showing a configurational example of a solid-state imaging device with a column parallel ADC mounted therein (CMOS image sensor) according to a second embodiment of the invention.

This solid-state imaging device 300 has a pixel array section 310 as an imaging section, a vertical scanning circuit 320 and a horizontal transfer scanning circuit 330 as a pixel drive section, and a timing control circuit 340 as shown in FIG. 15.

The solid-state imaging device 300 further has an ADC group 350, digital analog converters (hereinafter DACs) 360, amplifier circuits (S/A) 370, signal processing circuits 380, and a boosting power supply section 390.

The pixel array section 310 is configured to include photodiodes and intra-amplifiers and have pixels arranged in a matrix form (in rows and columns) as shown in FIG. 2.

The solid-state imaging device 300 has the following circuits as a control circuit for reading signals from the pixel array section 310 in order.

That is, the timing control circuit 340 which generates an internal clock, the vertical scanning circuit 320 which controls a row address and row scanning, and the horizontal transfer scanning circuit 330 which controls a column address and column scanning are disposed as the control circuit in the solid-state imaging device 300.

Then, the boosting power supply section 170 described above in connection with FIGS. 3 to 14 is adopted as the boosting power supply section 390.

The ADC group 350 has a plurality of ADCs each including a comparator 351, a counter 352 and a latch 353.

The comparator 351 compares a reference voltage Vslop having a ramp waveform obtained by stepwise changing the reference voltage generated by the DAC 360, with an analog signal obtained row by row from pixels via the vertical signal line.

The counter 352 counts the comparison time of the comparator 351.

The ADC group 350 has an n-bit digital signal conversion capability, and is arranged for each vertical signal line (column line), thus forming a column parallel ADC block.

The output of each latch 353 is connected to a horizontal transfer line LHTX having, for example, a 2n-bit width.

Then, 2n amplifier circuits 370 and signal processing circuits 380, which correspond to the horizontal transfer lines LHTX, are arranged.

In the ADC group 350, an analog signal supplied to potential Vsl read onto the vertical signal line is compared with the reference voltage Vslop (slope waveform which linearly changes at a slope) by the comparator 351 arranged for each column.

At this time, the counters 352, arranged column by column like the comparators 351, are in operation, and as the potential Vslop having a ramp waveform and the counter value change in one-to-one association to convert the potential (analog signal) Vsl on the vertical signal line to a digital signal.

A change in reference voltage Vslop converts a change in voltage to a change in time, and is converted to a digital value as the time is counted every certain period (clock).

When the analog electric signal Vsl crosses the reference voltage Vslop, the output of the comparator 351 is inverted, stopping the input clock of the counter 352, which completes AD conversion.

After the AD conversion period ends, data held in the latches 353 are input to the signal processing circuit 380 via the amplifier circuit 370 by the horizontal transfer scanning circuit 330, generating a two-dimensional image. The column parallel output process is carried out this way.

In the CMOS image sensor 300 having the boosting power supply section 390, next driving takes place.

The vertical scanning circuit 120 the reset signal RST having the amplitude of the boosted voltage, e.g., 3.6 V, boosted by the boosting power supply section 170, to at least the reset control line LRST in the reset control line LRST, the transfer control line LTx and the select control line LSEL to drive the reset control line LRST.

The solid-state imaging device having such an advantage can be adapted as an imaging device for a digital camera or a video camera.

<8. Third Embodiment>

Figure 16:
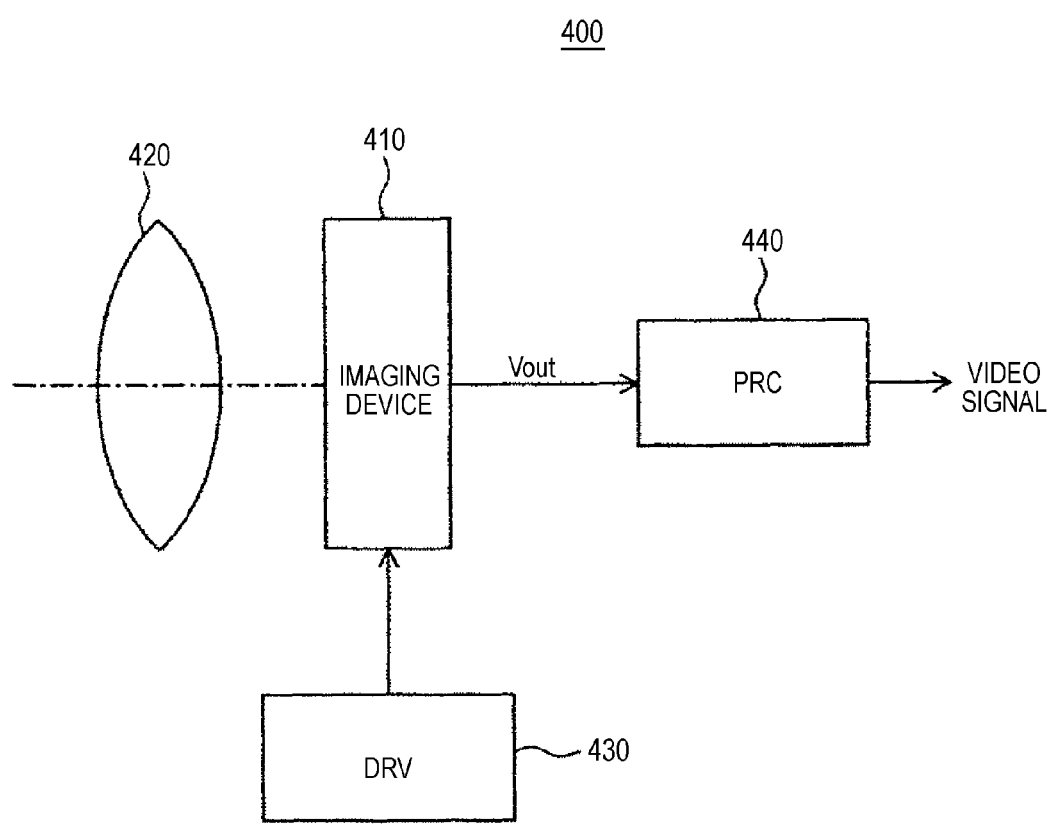
FIG. 16 is a diagram showing an example of the configuration of a camera system to which a third embodiment of the invention is adapted.

FIG. 16 is a diagram showing an example of the configuration of a camera system to which a third embodiment of the invention is adapted.

As shown in FIG. 16, this camera system 400 has an imaging device 410 to which the CMOS image sensor (solid-state imaging device) 100, 300 according to the embodiment is applicable, and an optical system which guides incident light (forms a subject image) to the pixel area of the imaging device 410, e.g., a lens 420 which forms the image of the incident light (image light) on the imaging surface. The camera system 400 further has a drive circuit (DRV) 430 which drives the imaging device 410, and a signal processing circuit (PRC) 440 which processes the output signal of the imaging device 410.

The drive circuit 430 has a timing generator (not shown) which generates various timing signals including a start pulse and clock pulse to drive the internal circuits of the imaging device 410, and drives the imaging device 410 in response to a predetermined timing signal.

The signal processing circuit 440 performs predetermined signal processing on the output signal of the imaging device 410.

The image signal processed by the signal processing circuit 440 is recorded in a recording medium, such as a memory. A hard copy of image information recorded in the recording medium is made by a printer or the like. The image signal processed by the signal processing circuit 440 is displayed as a dynamic image on a monitor having a liquid crystal display or the like.

As described above, as the foregoing imaging device 100, 300 is installed as the imaging device 410 in an imaging apparatus, such as a digital still camera, it is possible to realize a high precision camera with low power consumption.

It should be understood by those skilled in the art that various modifications, combinations, sub-combinations and alterations may occur depending on design requirements and other factors insofar as they are within the scope of the appended claims or the equivalents thereof.

What is claimed is:

1. A booster circuit comprising:
   an output terminal;
   a reference voltage generating section that generates a boosting reference voltage;
   a charge pump section that boosts the reference voltage and outputs the boosted reference voltage via the output terminal; and
   an output-terminal voltage holding section that holds the output terminal at a voltage of a high level at a standby time,
   wherein, (1) the charge pump section includes
      (a) an input node to which the reference voltage is input,
      (b) at least one boosting node formed between the input node and the output terminal,
      (c) at least one reference node corresponding to the boosting node and formed between the input node and a reference potential,
      (d) at least one boosting capacitor having a first terminal connected to a corresponding boosting node and a second terminal connected to a corresponding reference node, and
      (e) a plurality of switching transistors that are provided between the input node and the at least one boosting node, between a boosting node at a last stage and the output terminal, between the input node and the reference node, and between the reference potential and the reference node, and are switched on or off by a switch signal, and
   (2) at the standby time, the output-terminal voltage holding section connects an output side of the reference voltage generating section or the output terminal to a potential equivalent to the high level, and controls an on/off action of those of the switching transistors which are connected between at least the input node in the charge pump section and the output terminal, depending on whether the potential equivalent to the high level is connected to the output side of the reference voltage generating section or the output terminal.

2. The booster circuit according to claim 1, wherein:
   in the charge pump section, those of the plurality of switching transistors which are connected between at least the input node and the output terminal include a parasitic diode, and are connected in such a way that the parasitic diode has a forward direction from the input node toward the output terminal, and
   at the standby time, when the potential equivalent to the high level is connected to the output side of the reference voltage generating section, the output-terminal voltage holding section performs control in such a way that the switching transistors which are connected between at least the input node and the output terminal, and at least switching transistors connected to the input node among the switching transistors connected between the input node and the reference potential are turned off.

3. The booster circuit according to claim 1, wherein:
   in the charge pump section,
      (a) the plurality of switching transistors include a parasitic diode,
      (b) the switching transistors which are connected between the input node and the output terminal are connected in such a way that the parasitic diode has a forward direction from the input node toward the output terminal, and
      (c) the switching transistors which are connected between the input node and the reference potential are connected in such a way that the forward direction of the parasitic diode is from the reference potential toward the input node; and
   at the standby time, when the potential equivalent to the high level is connected to the output side of the reference voltage generating section, the output-terminal voltage holding section performs control in such a way that the plurality of the switching transistors are turned off.

4. The booster circuit according to claim 1, wherein:
   in the charge pump section, those of the plurality of switching transistors which are connected between at least the input node and the output terminal include a parasitic diode, and are connected in such a way that the parasitic diode has a forward direction from the input node toward the output terminal; and at the standby time, when the potential equivalent to the high level is connected to the output terminal, the output-terminal voltage holding section performs control in such a way that those of the switching transistors which are connected between at least the input node and the output terminal are turned off.

5. The booster circuit according to claim 1, wherein:

in the charge pump section,
- (a) the plurality of switching transistors include a parasitic diode,
- (b) the switching transistors which are connected between the input node and the output terminal are connected in such a way that the parasitic diode has a forward direction from the input node toward the output terminal, and
- (c) the switching transistors which are connected between the input node and the reference potential are connected in such a way that the forward direction of the parasitic diode is from the reference potential toward the input node; and at the standby time, when the potential equivalent to the high level is connected to the output terminal, the output-terminal voltage holding section performs control in such a way that the plurality of the switching transistors are turned off.

* * * * *